United States Patent
Ogata et al.

(10) Patent No.: US 8,870,182 B2
(45) Date of Patent: Oct. 28, 2014

(54) SHEET CONVEYING APPARATUS AND IMAGE FORMING APPARATUS

(75) Inventors: Atsushi Ogata, Mishima (JP); Akira Kuroda, Numazu (JP); Yuichi Obara, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/823,235

(22) PCT Filed: Oct. 7, 2011

(86) PCT No.: PCT/JP2011/073758
§ 371 (c)(1),
(2), (4) Date: Mar. 14, 2013

(87) PCT Pub. No.: WO2012/050217
PCT Pub. Date: Apr. 19, 2012

(65) Prior Publication Data
US 2013/0181394 A1 Jul. 18, 2013

(30) Foreign Application Priority Data
Oct. 13, 2010 (JP) .................. 2010-230412

(51) Int. Cl.
| | | |
|---|---|---|
| B65H 5/00 | (2006.01) | |
| G03G 15/23 | (2006.01) | |
| B41J 3/60 | (2006.01) | |
| H04N 1/00 | (2006.01) | |
| B41J 13/00 | (2006.01) | |
| B65H 85/00 | (2006.01) | |

(52) U.S. Cl.
CPC ............ *B65H 85/00* (2013.01); *G03G 15/234* (2013.01); *B41J 3/60* (2013.01); *H04N 1/00578* (2013.01); *B41J 13/0045* (2013.01); *Y10S 271/902* (2013.01)
USPC ........................ 271/225; 271/902; 399/401

(58) Field of Classification Search
USPC ............... 271/314, 81, 902, 273, 274, 225; 399/401, 402, 374
See application file for complete search history.

(56) References Cited

U.S. PATENT DOCUMENTS

| | | | |
|---|---|---|---|
| 4,924,275 A | 5/1990 | Nelson | |
| 4,956,678 A | 9/1990 | Kiya et al. | |

(Continued)

FOREIGN PATENT DOCUMENTS

| | | |
|---|---|---|
| JP | H01-269949 A | 10/1989 |
| JP | 2005-200163 A | 7/2005 |
| JP | 2008-70489 A | 3/2008 |

OTHER PUBLICATIONS

U.S. Appl. No. 13/869,137, filed Apr. 24, 2013; Inventors: Hiroto Endo, Masaru Aoki, and Atsushi Ogata.

(Continued)

*Primary Examiner* — Jeremy R Severson
(74) *Attorney, Agent, or Firm* — Fitzpatrick, Cella, Harper & Scinto

(57) ABSTRACT

A sheet conveying apparatus, including: a sheet conveying path; a reconveying path, which is branched from the sheet conveying path; a sheet conveying portion which conveys a sheet, which is conveyed through the sheet conveying path, selectively between in a forward direction and in a reverse direction toward the reconveying path; and a control portion which controls the sheet conveying portion to temporarily convey, in the middle that the sheet conveying portion conveys a preceding sheet in the reverse direction toward the reconveying path, the preceding sheet in the forward direction together with a succeeding sheet, and thereafter convey the preceding sheet in the reverse direction toward the reconveying path and the succeeding sheet in the forward direction respectively.

18 Claims, 25 Drawing Sheets

(56) References Cited

U.S. PATENT DOCUMENTS

| | | | |
|---|---|---|---|
| 5,008,713 A * | 4/1991 | Ozawa et al. | 399/402 |
| 5,014,976 A | 5/1991 | Muck et al. | |
| 5,093,690 A | 3/1992 | Ohno et al. | |
| 5,132,742 A * | 7/1992 | Goto | 399/401 |
| 5,621,451 A | 4/1997 | Sugiura et al. | |
| 5,907,745 A | 5/1999 | Azuma et al. | |
| 6,302,606 B1 | 10/2001 | Hayakawa et al. | |
| 6,325,371 B1 | 12/2001 | Araki et al. | |
| 6,382,614 B1 | 5/2002 | Fukatsu | |
| 6,382,616 B1 | 5/2002 | Waragai et al. | |
| 6,561,503 B1 | 5/2003 | Ogata et al. | |
| 6,637,996 B1 | 10/2003 | Hayakawa et al. | |
| 7,331,647 B2 | 2/2008 | Nakanishi et al. | |
| 7,717,423 B2 * | 5/2010 | Litman et al. | 271/273 |
| 7,753,368 B2 | 7/2010 | Sekiyama et al. | |
| 8,038,147 B2 | 10/2011 | Ogata et al. | |
| 8,061,712 B2 | 11/2011 | Tsuji et al. | |
| 8,107,874 B2 * | 1/2012 | Yoon | 399/401 |
| 8,382,109 B2 | 2/2013 | Tsuji et al. | |
| 8,444,141 B2 | 5/2013 | Sekiyama et al. | |
| 2006/0072138 A1 * | 4/2006 | Nakanishi et al. | 358/1.12 |
| 2013/0187330 A1 * | 7/2013 | Kuroda et al. | 271/225 |

OTHER PUBLICATIONS

Notification Concerning Transmittal of International Preliminary Report on Patentability (Chapter 1 of the Patent Cooperation Treaty) and Written Opinion of the International Searching Authority.
Chinese Office Action issued in Chinese Application No. 201180048829.3 dated Jul. 2, 2014.

\* cited by examiner

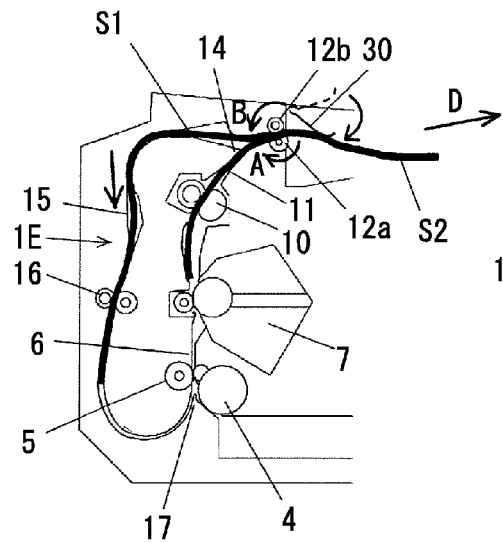

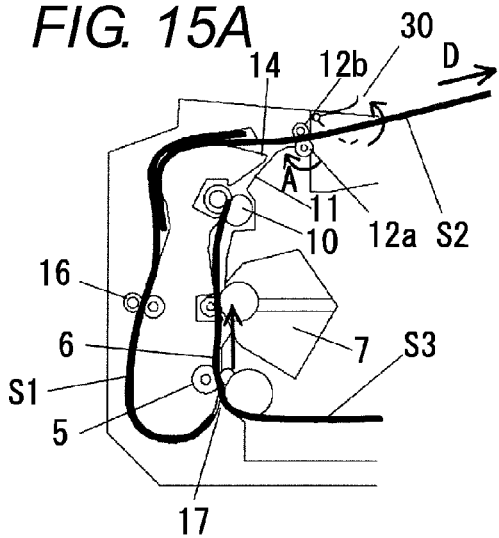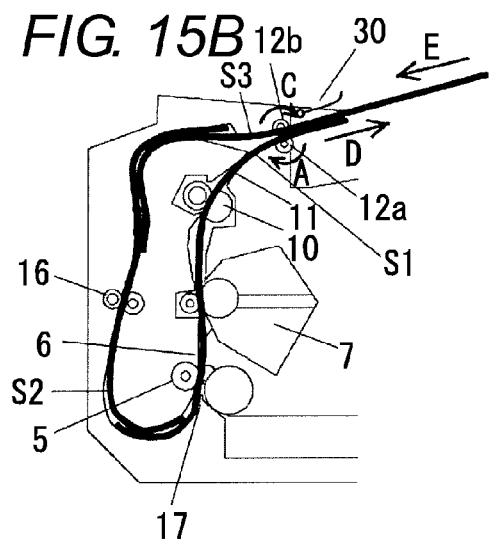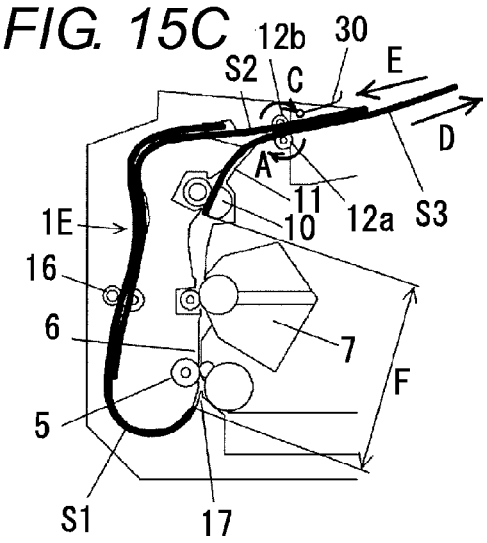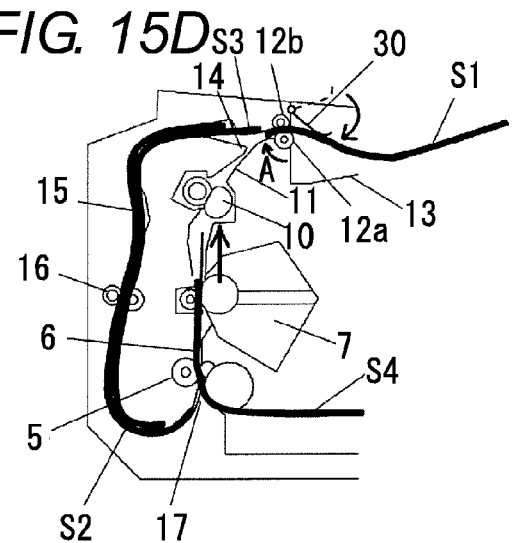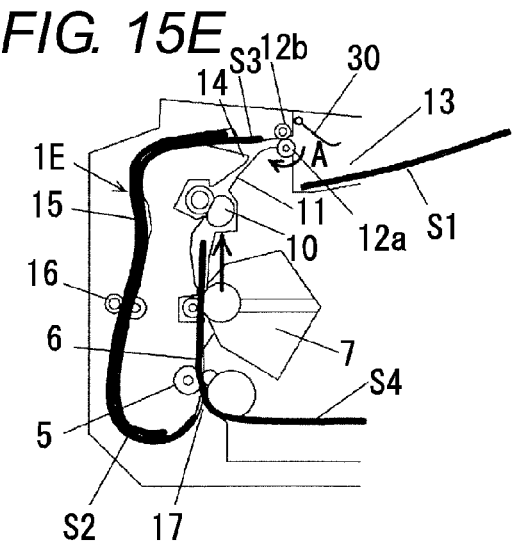

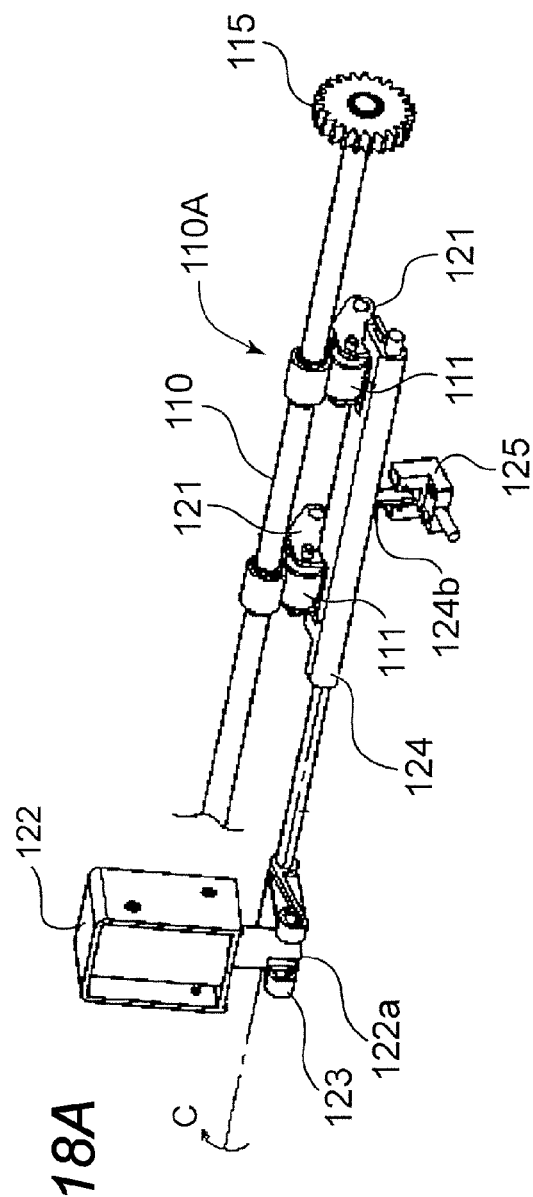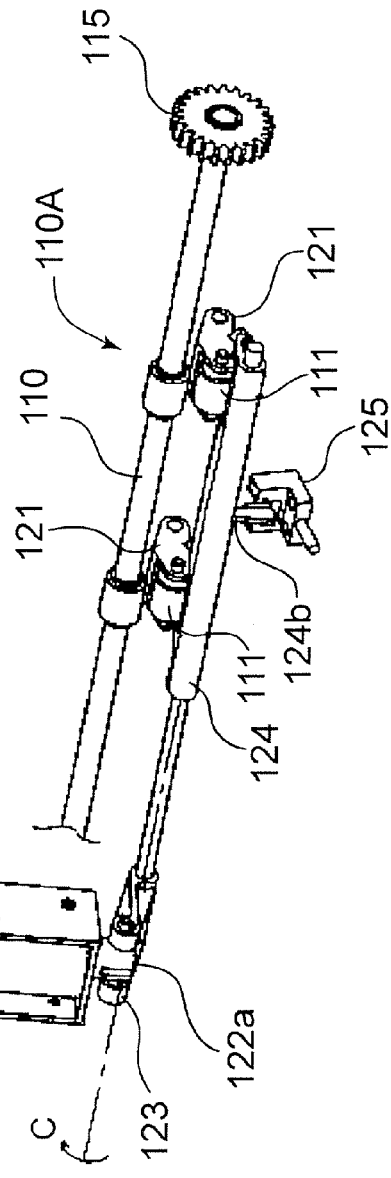
FIG. 18A
FIG. 18B

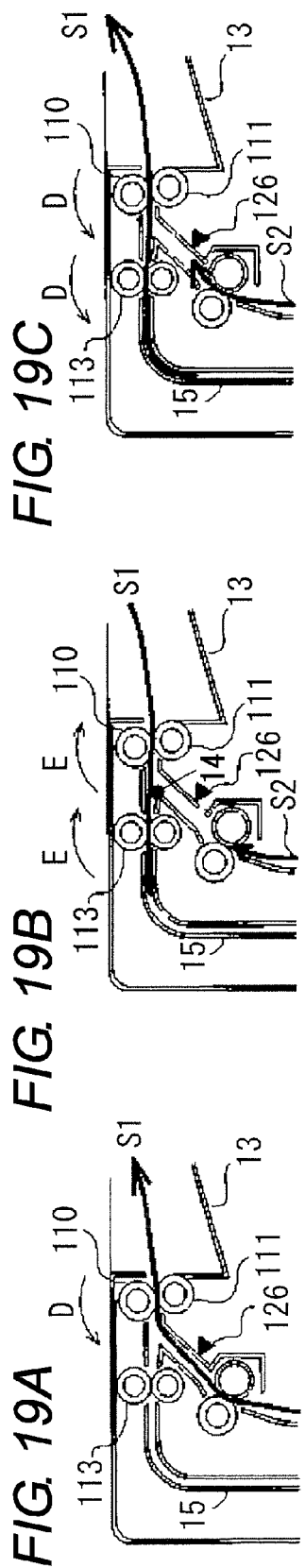
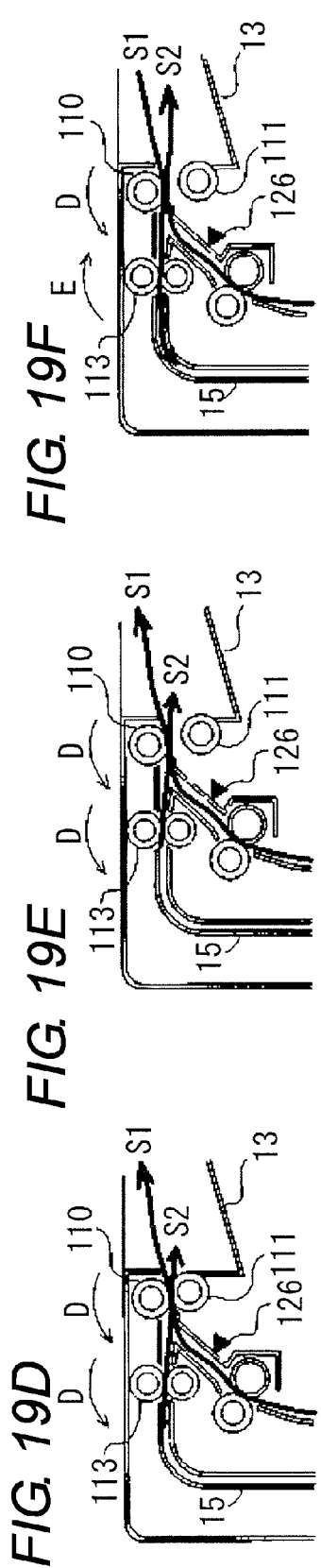
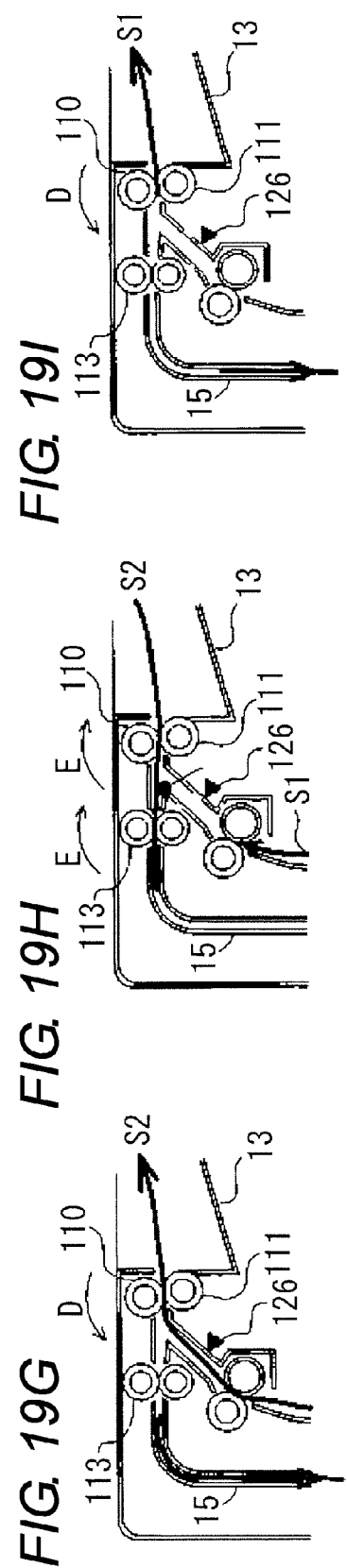

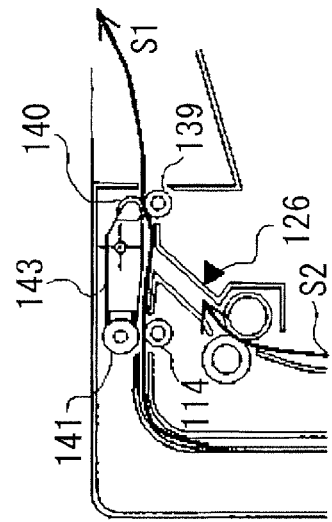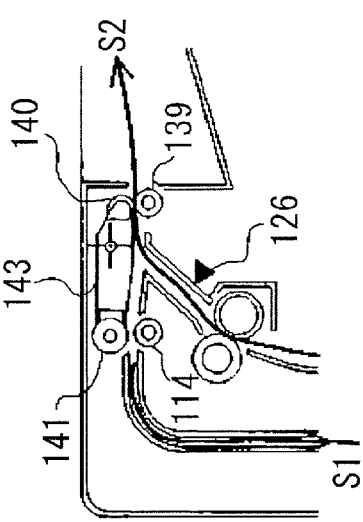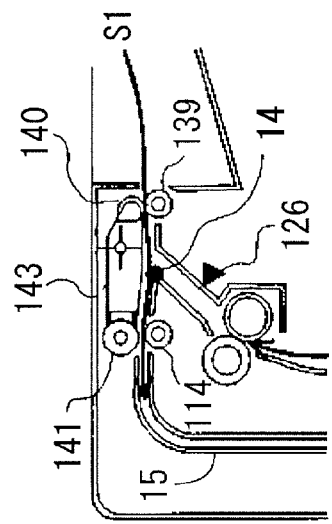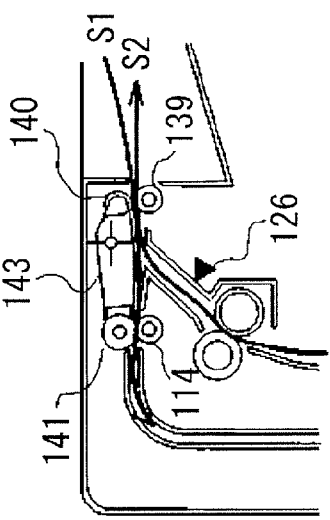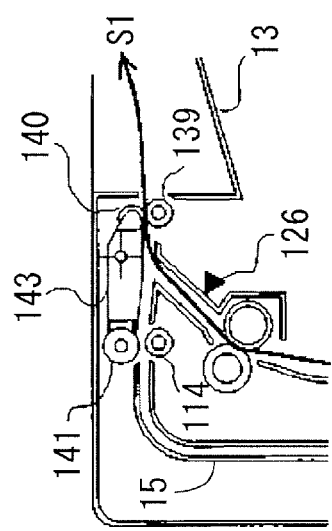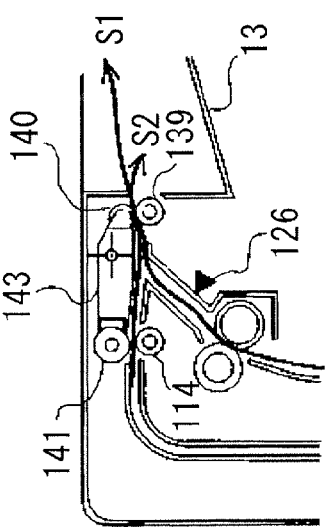

SHEET CONVEYING APPARATUS AND IMAGE FORMING APPARATUS

TECHNICAL FIELD

The present invention relates to a sheet conveying apparatus and an image forming apparatus.

BACKGROUND ART

Conventionally, an image forming apparatus such as a copying machine, a printer, and a facsimile machine, and an image reading apparatus, each include a sheet conveying apparatus for reversing a sheet, such as recording paper and a document, and reconveying the reversed sheet to an image forming portion and an image reading portion. For example, in the image forming apparatus including the sheet conveying apparatus, after the image forming portion forms an image on one side (first side) of the sheet, the sheet conveying apparatus reconveys the sheet to the image forming portion, and the image forming portion forms an image on the other side (second side) of the sheet.

As the sheet conveying apparatus, there is a sheet conveying apparatus including forward and reverse rotatable sheet discharging rollers, which perform forward and reverse rotation at the time of forming an image on the second side of the sheet, to thereby convey the sheet to a reconveying passage while switching back the sheet (see PTL 1). However, in the case of this structure, the succeeding sheet cannot reach the sheet discharging roller pair until the preceding sheet that is being reversed exits the sheet discharging rollers completely and the rotation direction of the sheet discharging roller pair is switched to a normal direction. Therefore, at the time of successive printing, large sheet intervals need to be ensured, resulting in lower productivity.

In view of the above, in order to enhance the productivity, as an automatic document feeder serving as the sheet conveying apparatus which is provided in, for example, the image reading apparatus to convey a document to the image reading portion, there is an automatic document feeder capable of separating a driven rotatable member that is brought into pressure contact with a sheet reversing roller to convey the document (see PTL 2). After the preceding sheet (document) reversed by the sheet reversing roller reaches an intermediate roller arranged downstream of the sheet reversing roller in a sheet reversing direction, the driven rotatable member is separated, and therefore the preceding sheet and the succeeding sheet are conveyed to pass each other by the sheet reversing roller. As a result, the productivity is enhanced. Note that, as the structure in which the two sheets are conveyed to pass each other, there is a structure in which the sheet reversing roller is provided with a torque limiter, to thereby enhance the productivity without separating the sheet reversing roller (see PTL 3). However, in the structures of PTL 2 and PTL 3, the edge (leading edge) of the succeeding sheet traveling toward the sheet reversing roller is brought into contact with the surface of the preceding sheet that is being conveyed away from the sheet reversing roller. In this case, the edge of the succeeding sheet may damage the surface of the preceding sheet. Note that, in a case of the sheet having an image formed thereon, the damage to the surface of the sheet refers to degradation in quality of the image thus formed, and in a case where the sheet to be conveyed is a document, the damage to the surface of the sheet refers to degradation in quality of the document surface due to slide contact with the edge of the sheet. Further, the damage to the surface of the sheet is significant due to the fact that the moving direction of the surface of the preceding sheet and the moving direction of the edge of the succeeding sheet pass each other.

CITATION LIST

Patent Literature

PTL 1: Japanese Patent Application Laid-Open No. 2008-70489
PTL 2: Japanese Patent Application Laid-Open No. 2005-200163
PTL 3: Japanese Patent Application Laid-Open No. H01-269949

SUMMARY OF INVENTION

Therefore, the present invention has an object to provide a sheet conveying apparatus and an image forming apparatus which are capable of stably performing a sheet reversing operation with a simple structure and with no image quality degradation.

The present invention provides a sheet conveying apparatus, including: a sheet conveying path; a reconveying path, which is branched from the sheet conveying path; a sheet conveying portion which conveys a sheet, which is conveyed through the sheet conveying path, selectively between in a forward direction and in a reverse direction toward the reconveying path; and a control portion which controls the sheet conveying portion to temporarily convey, in the middle that the sheet conveying portion conveys a preceding sheet in the reverse direction toward the reconveying path, the preceding sheet in the forward direction together with a succeeding sheet, and thereafter convey the preceding sheet in the reverse direction toward the reconvening path and the succeeding sheet in the forward direction respectively.

As in the present invention, the preceding sheet is conveyed in the forward direction together with the succeeding sheet before the preceding sheet is conveyed toward the reconveying path with the preceding sheet and the succeeding sheet passing each other. Accordingly, the sheet reversing operation can be performed stably with a simple structure and with no image quality degradation.

Further features of the present invention will become apparent from the following description of exemplary embodiments with reference to the attached drawings.

BRIEF DESCRIPTION OF DRAWINGS

FIGS. 14A, 14B, 14C, and 14D are third explanatory views illustrating the operation of the sheet conveying apparatus at the time of successive duplex image formation.

FIGS. 15A, 15B, 15C, 15D, and 15E are fourth explanatory views illustrating the operation of the sheet conveying apparatus at the time of successive duplex image formation.

FIGS. 18A and 18B are explanatory views illustrating a separating mechanism which separates a sheet discharging rotatable member from a sheet discharging roller, which are provided in the sheet conveying apparatus.

FIGS. 19A, 19B, 19C, 19D, 19E, 19F, 19G, 19H, and 19I are explanatory views illustrating an operation of the sheet conveying apparatus at the time of successive duplex image formation.

FIGS. 25A, 25B, 25C, 25D, 25E, and 25F are explanatory views illustrating an operation of the sheet conveying apparatus at the time of successive duplex image formation.

DESCRIPTION OF EMBODIMENTS

Figure 1:
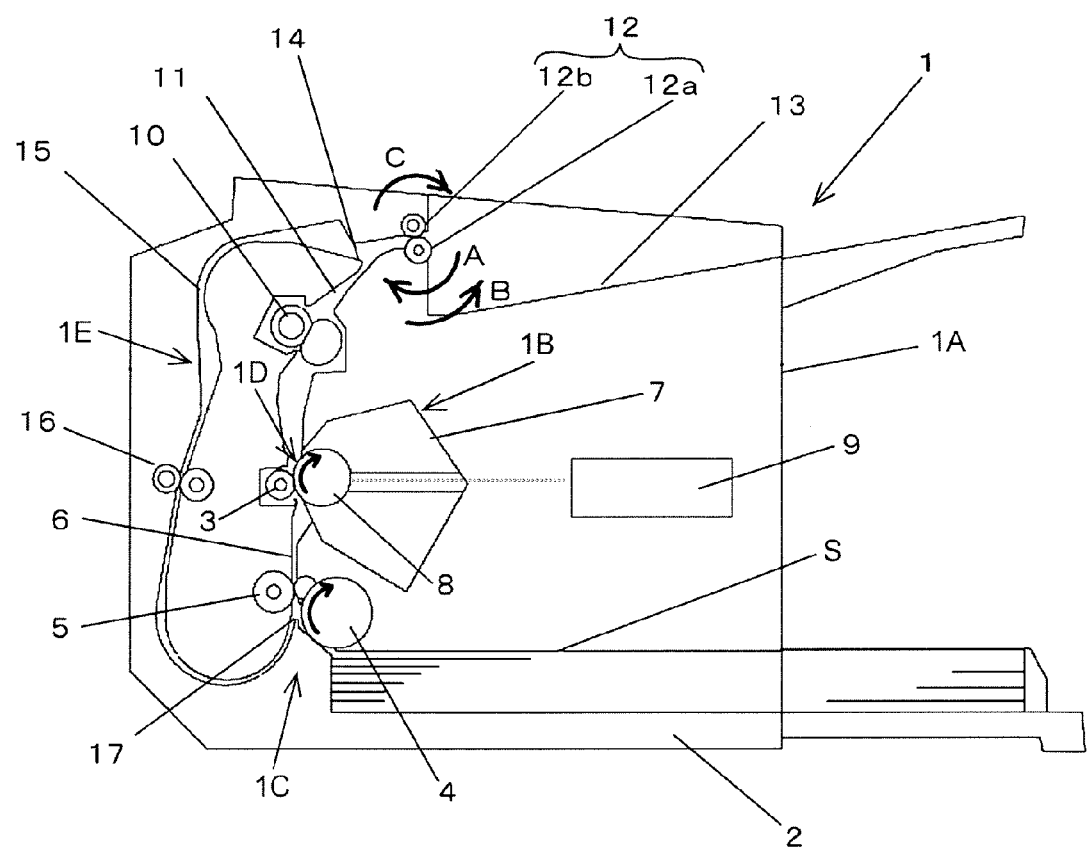
FIG. 1 is a view illustrating a schematic structure of a laser beam printer as an example of an image forming apparatus including a sheet conveying apparatus according to a first embodiment of the present invention.

Hereinafter, referring to the attached drawings, exemplary embodiments of the present invention are described in detail. FIG. 1 is a view illustrating a schematic structure of a laser beam printer as an example of an image forming apparatus including a sheet conveying apparatus according to a first embodiment of the present invention.

In FIG. 1, a laser beam printer 1 has a laser beam printer main body (hereinafter, referred to as "printer main body") 1A as an image forming apparatus main body. The laser beam printer 1 includes an image forming portion 1B, a sheet feeding portion 1C which feeds a sheet S to the image forming portion 1B, a transfer portion 1D, a fixing portion 10, and a sheet conveying apparatus 1E which reconveys a sheet having an image formed on one side to the image forming portion 1B.

In this structure, the image forming portion 1B removably includes a process cartridge 7 integrally including process units such as a photosensitive drum 8 serving as an image bearing member, a developing sleeve (not shown), a charge roller (not shown), and a cleaning blade (not shown). Further, the image forming portion 1B includes a laser exposure device 9 which exposes a surface of the photosensitive drum 8 to light to form an electrostatic latent image on the photosensitive drum 8.

Further, the sheet feeding portion 1C includes an openable and closable sheet feed tray 2, on which the sheets S are to be stacked, and a feeding roller 4 which feeds the sheets S on the sheet feed tray one by one. Note that, the feeding roller 4 rotates one revolution by a one-revolution control unit (not shown) after receiving a sheet feeding start signal from a control portion (not shown), to thereby feed the sheet S toward the image forming portion 1B.

The transfer portion 1D includes the photosensitive drum 8, and a transfer roller 3 to be brought into pressure contact with the photosensitive drum 8 to form a transfer nip, the transfer roller 3 transferring, onto the sheet S, a toner image on the photosensitive drum 8 when the sheet S passes through the transfer nip.

The sheet conveying apparatus 1E includes a sheet discharging roller pair 12, which performs reverse rotation to reverse the sheet S, a reconveying passage (reconveying path) 15, along which the reversed sheet S is reconveyed to the image forming portion 1B, and reconveying rollers 16 provided in the reconveying passage 15, for conveying the sheet to conveying rollers 5. Note that, there are defined a conveying path 6 provided between the transfer portion 1D and the sheet feeding portion 1C, a sheet discharge conveying path (sheet conveying path) 11 provided between the fixing portion 10 and the sheet discharging roller pair 12, a branch point 14 between the reconveying passage 15 and the sheet discharge conveying path 11, and a junction point 17 between the reconveying passage 15 and the conveying path 6. The sheet discharging roller pair 12 is provided on a downstream side of the junction point 17 in a sheet conveying direction, and when the sheet discharging roller pair 12 performs selectively between forward rotation and reverse rotation, the sheet is selectively conveyed between toward the sheet discharge conveying path side and toward the reconveying passage side.

Next, an image forming operation to be performed in the laser beam printer 1 structured as described above will be described. When the image forming operation is started, the feeding roller 4 first rotates in an arrow direction in response to the sheet feeding start signal from the control portion (not shown). Accordingly, the feeding roller 4 sends out the sheet S, and the sheet S thus sent out is conveyed by the conveying rollers 5 along the conveying path 6. When a sheet leading edge sensor (not shown) detects the sheet, the laser exposure device 9 then irradiates the photosensitive drum 8 with a laser beam based on image information.

Further, when the image forming operation is started, the photosensitive drum 8 rotates in an arrow direction, and is uniformly charged by the charge roller (not shown) so as to have a predetermined polarity and a predetermined potential. When the photosensitive drum 8 thus charged on its surface is irradiated with the laser beam, an electrostatic latent image is formed on the photosensitive drum 8. Then, the electrostatic latent image is developed with toner supplied from the developing sleeve, and is visualized as a toner image.

Subsequently, the visualized toner image on the photosensitive drum is transferred by the transfer roller 3 onto the sheet S that is conveyed to the transfer portion 1D. The sheet S having the toner image transferred thereto is heated and pressurized by the fixing portion 10 so that the toner image is fixed onto the sheet. Subsequently, the sheet S having the toner image thus fixed thereto is discharged by the sheet discharging roller pair 12 out of the printer main body via the sheet discharge conveying path 11 that is provided downstream of the fixing portion 10 in the sheet conveying direction. The discharged sheet S is stacked on a sheet discharge tray 13.

On the other hand, in a case where images are formed on both sides of the sheet S, based on a sheet trailing edge detection signal from a sheet reverse sensor 51 of FIG. 3 described later, which is provided in the sheet discharge conveying path 11, a control portion 50 of FIG. 3 described later causes the sheet discharging roller pair 12 to perform reverse rotation after a trailing edge of the sheet passes through the branch point 14. Accordingly, the sheet S is conveyed in a reverse direction with the former trailing edge side as a head.

At this time, a nip direction of the sheet discharging roller pair 12 serving as a conveying roller pair is oriented toward the reconveying passage 15, and hence the sheet is sent to the reconveying passage 15 by the sheet discharging roller pair 12 and the stiffness of the sheet itself. Note that, in order to reliably send the sheet into the reconveying passage 15, a flapper (not shown) may be provided at the branch point 14 to restrict the sheet S to be fed backward from returning to the sheet discharge conveying path 11. The sheet S thus fed backward is further conveyed by the reconveying rollers 16, and is joined to the conveying path 6 again via the junction point 17. Accordingly, the sheet is guided to the conveying rollers 5 again in a state in which the front side and the back side of the sheet is reversed, and after the sheet has undergone the same image formation as in the case of single-side printing, the sheet is stacked on the sheet discharge tray 13 by the sheet discharging roller pair 12.

By the way, in this embodiment, the sheet discharging roller pair 12 includes a lower roller 12a as a rubber roller, and an upper roller 12b abutting against the lower roller 12a. The lower roller 12a and the upper roller 12b nip and convey the sheet together. In this case, a frictional force between the sheet and each of the lower roller 12a and the upper roller 12b is larger than a frictional force between the sheets. Further, the lower roller 12a is drivable both in a clockwise direction indicated by an arrow A and in a counterclockwise direction indicated by an arrow B. Specifically, the lower roller 12a serving as a first conveying roller is rotationally drivable at least in a forward rotation direction, which enables the sheet to be conveyed in a forward direction with respect to the conveying direction.

The upper roller 12b is drivable in an arrow C direction, and the drive thereof may be canceled. Specifically, the upper roller 12b serving as a second conveying roller is rotationally drivable at least in a reverse rotation direction, which enables the sheet to be conveyed in a reverse direction with respect to the conveying direction. Further, when the drive of the upper roller 12b is canceled, the upper roller 12b is freely rotatable, and is therefore rotated in association with the rotation of the lower roller 12a or the movement of the sheet nipped by the upper roller 12b and the lower roller 12a.

Next, referring to FIGS. 2A and 2B, a drive mechanism which drives the sheet discharging roller pair 12 in the above-mentioned manner will be described. As the drive mechanism for the sheet discharging roller pair 12, various methods are conceivable, such as a method using a rocking gear mechanism or a clutch mechanism, and a method using dedicated drive motors provided to the upper and lower rollers. In this embodiment, planetary gearing mechanisms are used.

Figure 2A:
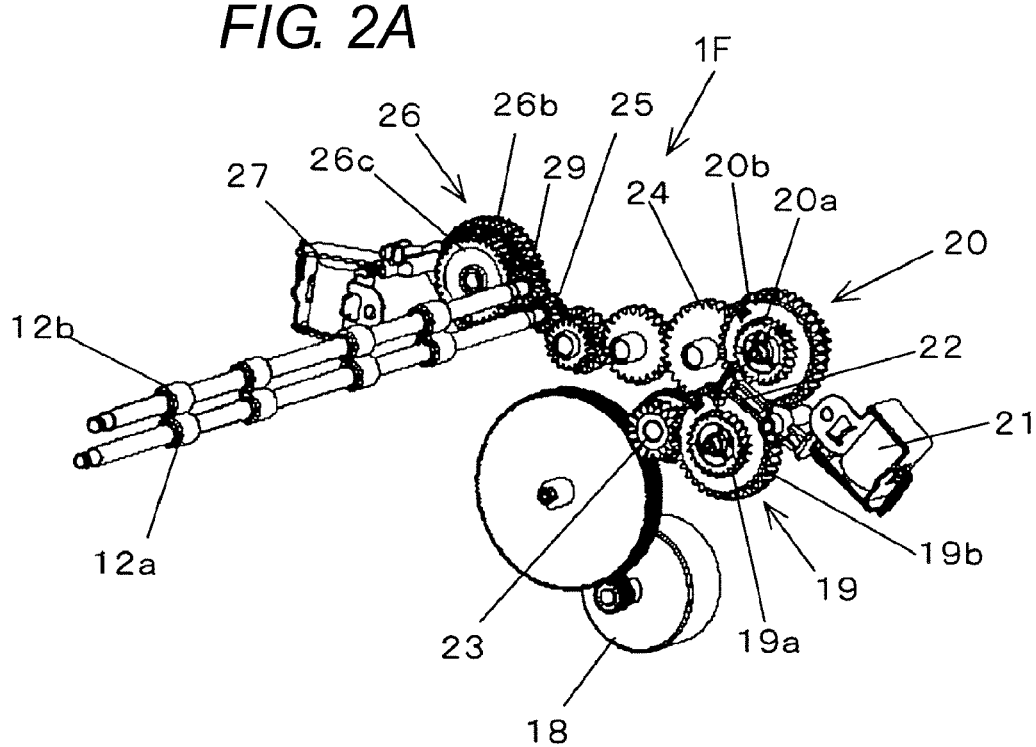
FIGS. 2A and 2B are explanatory views illustrating a drive mechanism which drives a sheet discharging roller pair of the laser beam printer.
Figure 2B:
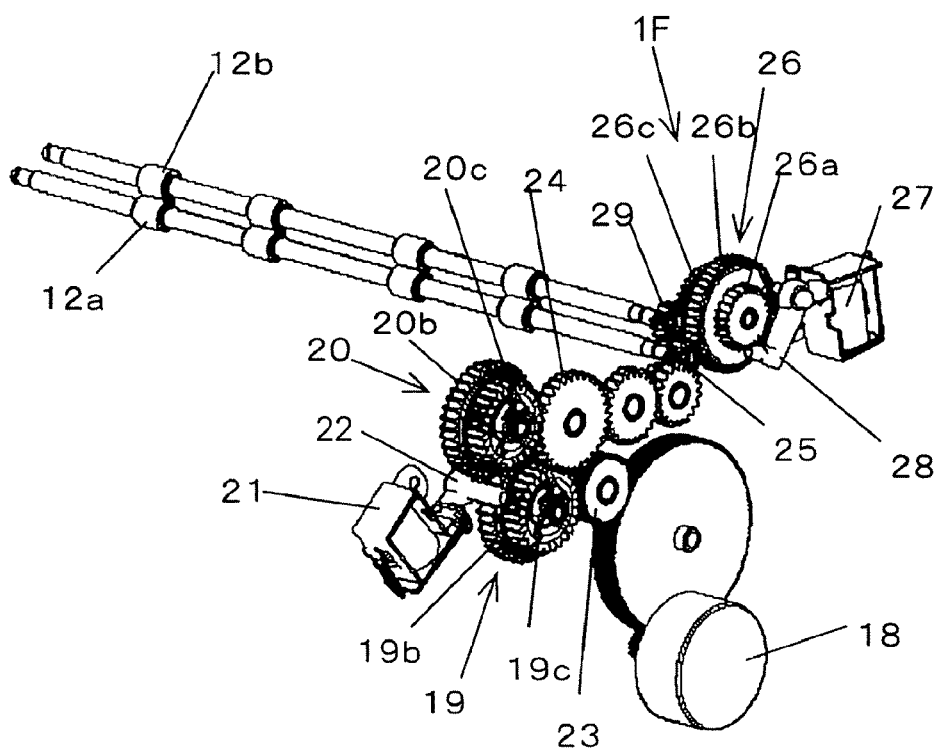

In FIGS. 2A and 2B, the drive mechanism includes a drive motor 18, which is a drive source which drives the lower roller 12a of the sheet discharging roller pair 12. Drive from the drive motor 18 is transmitted to the lower roller 12a through first and second planetary gearing mechanisms 19 and 20 each having planet gears (not shown) inside and serving as a first drive portion. Further, the drive mechanism includes a solenoid 21 which switches between drive of the first planetary gearing mechanism 19 and drive of the second planetary gearing mechanism 20. An arm 22 is connected to the solenoid 21 to fix one of sun gears 19a and 20a of the respective planetary gearing mechanisms 19 and 20 by meshing with a ratchet portion provided to each of the sun gears 19a and 20a. By turning ON (driving) and OFF (stopping driving) the solenoid 21, the arm 22 meshes with the ratchet portion of one of the sun gears 19a and 20a, to thereby restrict the rotation of the corresponding one of the sun gears 19a and 20a.

For example, in a case of driving the lower roller 12a in a sheet discharging direction (arrow A direction of FIG. 1), the solenoid 21 is turned OFF to fix the sun gear 19a of the first planetary gearing mechanism 19. When the sun gear 19a is fixed as described above, a drive force transmitted from a gear 23 to a carrier 19b is transmitted to an internal gear 19c. Hence, the first planetary gearing mechanism 19 acts as an idler gear, and the drive force is transmitted to a gear 24 by an outer peripheral gear of the internal gear 19c. Further, the drive force is transmitted from the gear 24 to a drive gear 25 which drives the lower roller 12a, and accordingly the lower roller 12a rotates in the sheet discharging direction. At this time, the second planetary gearing mechanism 20 is idled.

On the other hand, in a case of driving the lower roller 12a in a sheet reversing direction, the solenoid 21 is turned ON to fix the sun gear 20a of the second planetary gearing mechanism 20. In this case, the drive force is transmitted to a carrier 20b of the second planetary gearing mechanism 20 with the carrier 19b of the first planetary gearing mechanism 19 acting as the idler gear. The drive force is transmitted from an internal gear 20c to the gear 24, and further from the gear 24 to the drive gear 25. Accordingly, the lower roller 12a rotates in the sheet reversing direction. At this time, the internal gear 19c of the first planetary gearing mechanism 19 is idled. As described above, by switching ON and OFF the solenoid 21, even in a state in which the drive motor 18 constantly rotates in one direction, it is possible to switch the rotation direction of the lower roller 12a rotationally drivable in the forward rotation direction, which enables the sheet to be conveyed in the forward direction.

To the upper roller 12b of the sheet discharging roller pair 12, drive is transmitted from the drive gear 25 of the lower roller 12a through a third planetary gearing mechanism 26 serving as a second drive portion. The third planetary gearing mechanism 26 also has planet gears (not shown) inside, and a sun gear 26a thereof may be fixed and released by an arm 28 to be driven by turning ON and OFF a solenoid 27. When the sun gear 26a is fixed, a carrier 26b and an internal gear 26c act as the idler gear, and the drive is transmitted to a drive gear 29 which drives the upper roller 12b. Accordingly, the upper roller 12b rotates. When the fixation of the sun gear 26a is released, the carrier 26b and the internal gear 26c are idled independently of each other, and accordingly the drive force from the drive gear 25 is not transmitted to the drive gear 29.

As described above, by switching ON and OFF the solenoid 27, the upper roller 12b can be switched between the case of acting as a drive roller in the reverse direction and the case of acting as a driven roller. In other words, by switching ON and OFF the solenoid 27, it is possible to rotate, stop, or associatively rotate the upper roller 12b, which abuts against the lower roller 12a, and which is rotatable in association with the rotation of the lower roller 12a and rotationally drivable in the reverse rotation direction, which enables the sheet to be conveyed in the reverse direction.

The sheet discharging roller pair 12, the first to third planetary gearing mechanisms 19, 20, and 26, and the sheet reverse sensor 51 described later constitute a sheet conveying portion 1F through which the sheet, which is conveyed through the sheet discharge conveying path 11, is conveyed selectively between in the forward direction and in the reverse direction toward the reconveying passage 15.

Figure 3:
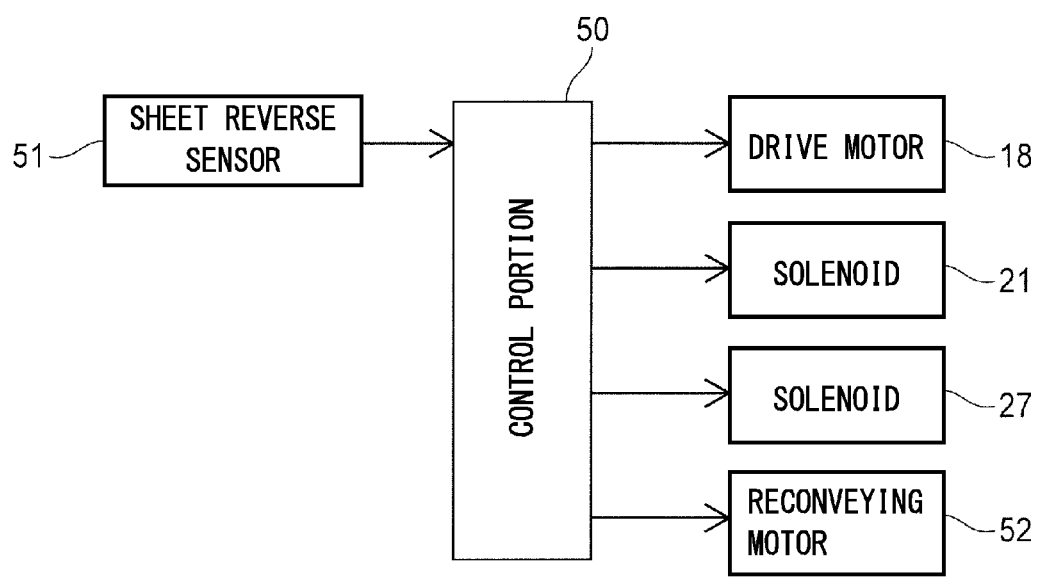
FIG. 3 is a control block diagram of the laser beam printer.

FIG. 3 is a control block diagram of the laser beam printer 1. The control portion 50 is provided in the printer main body 1A. Based on the sheet trailing edge detection signal from the sheet reverse sensor 51, which is a detecting portion which detects a position (the trailing edge position) of the sheet, the control portion 50 actuates the solenoids 21 and 27 to rotate the lower roller 12a and the upper roller 12b of the sheet discharging roller pair 12. Further, the control portion 50 controls drive of a reconveying motor 52 which drives the reconveying rollers 16.

Figure 4A:
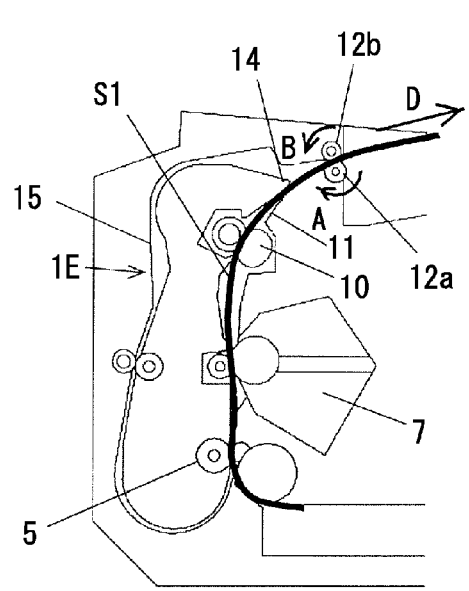
FIGS. 4A, 4B, 4C, and 4D are first explanatory views illustrating an operation of the sheet conveying apparatus at the time of successive duplex image formation.
Figure 4B:
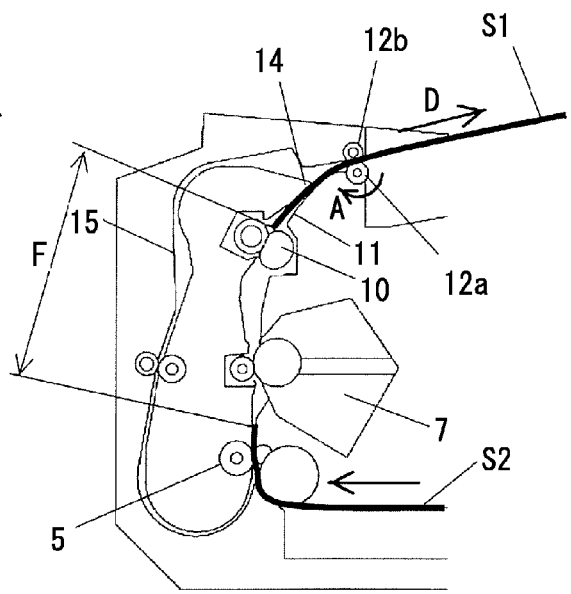

Next, an operation of the sheet conveying apparatus 1E including the sheet discharging roller pair 12, which performs forward and reverse rotation by the drive mechanism structured as described above, at the time of successive duplex image formation will be described. Before starting a duplex printing conveying operation for the successive duplex image formation, as illustrated in FIG. 4A, the lower roller 12a rotates in the arrow A direction (clockwise direction) so as to convey a first sheet S1. At this time, the drive of the upper roller 12b is canceled, and accordingly the upper roller 12b rotates in the arrow B direction (counterclockwise direction) in association with the rotation of the lower roller 12a. When the first sheet S1 reaches the sheet discharging roller pair 12 via the sheet discharge conveying path 11, the sheet discharging roller pair 12 nips the sheet S1 to convey the sheet S1 in the arrow D direction, which is the same forward direction as the sheet conveying direction. In a case of a successive sheet feeding operation, as illustrated in FIG. 4B, a second sheet S2 is conveyed at a predetermined interval F from a trailing edge of the first sheet S1.

Figure 4C:
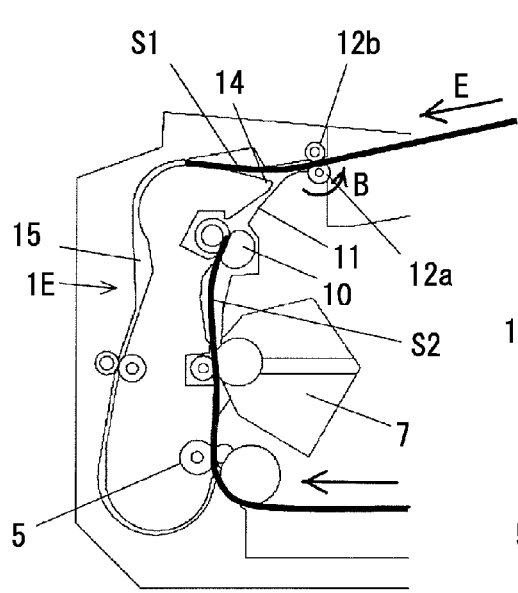

When the trailing edge of the sheet S1 passes through the branch point 14 between the sheet discharge conveying path 11 and the reconveying passage 15, the solenoid 21 is subsequently turned ON, and as illustrated in FIG. 4C, the rotation direction of the lower roller 12a is switched to the arrow B direction. Accordingly, the sheet S1 is conveyed in an arrow E direction, which is the reverse direction to the sheet conveying direction, with the former trailing edge side as a leading edge, and the sheet S1 is sent to the reconveying passage 15. In this case, the sheet S2 is conveyed at the predetermined interval F from the sheet S1. Because the interval is short, a leading edge of the sheet S2 reaches the sheet discharging roller pair 12 while the sheet S1 is being conveyed in the arrow E direction.

Figure 4D:
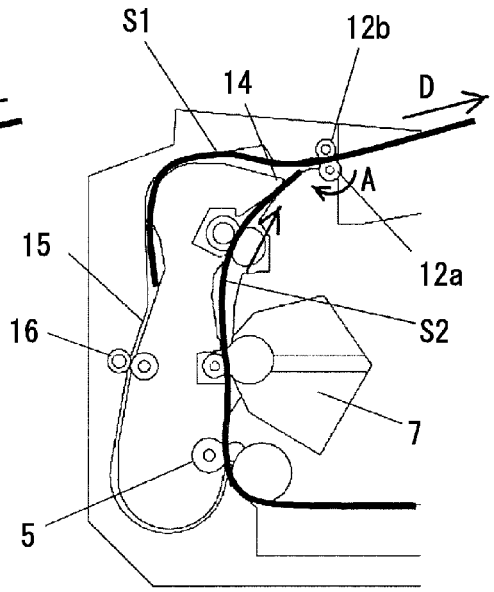
Figure 5A:
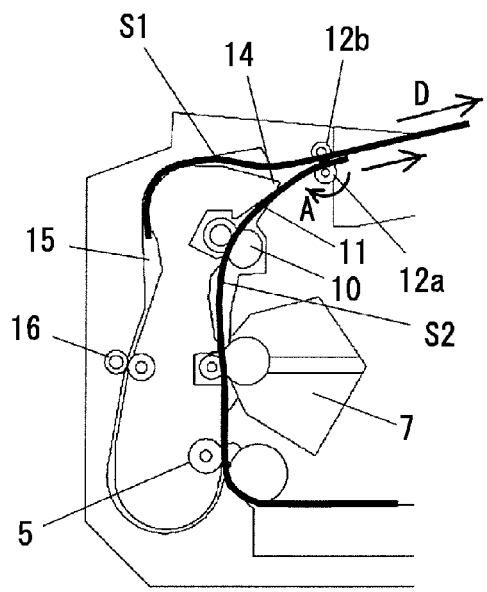
FIGS. 5A, 5B, 5C, and 5D are second explanatory views illustrating the operation of the sheet conveying apparatus at the time of successive duplex image formation.

At this time, in this embodiment, by turning OFF the solenoid 21 immediately before the leading edge of the sheet S2 reaches the sheet discharging roller pair 12, as illustrated in FIG. 4D, the drive direction of the lower roller 12a is first switched to the arrow A direction, with the result that the sheet S1 is conveyed in the arrow D direction. Accordingly, the sheet S2 is sent between the lower roller 12a and the sheet S1 that is being conveyed again in the arrow D direction, which is the forward direction, and as illustrated in FIG. 5A, the two sheets S1 and S2 are conveyed in the arrow D direction.

Figure 5B:
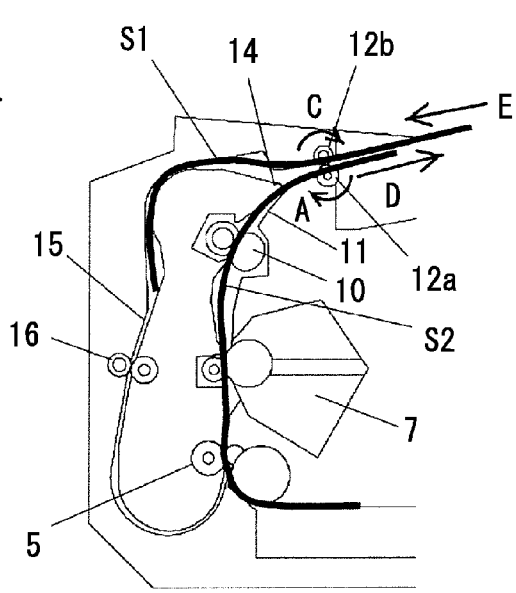
Figure 5C:
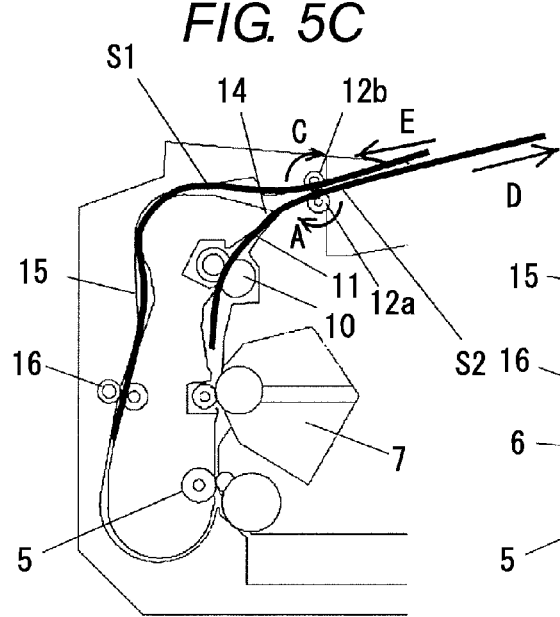

After the sheet S2 is securely nipped by the sheet discharging roller pair 12, the solenoid 27 is turned ON, and as illustrated in FIG. 5B, the upper roller 12b is rotationally driven again in the arrow C direction, which is the forward rotation direction. At this time, because the frictional force of the sheet discharging roller pair 12 is larger than the frictional force between the sheets, only the sheet S1 is conveyed in the arrow E direction by the upper roller 12b, whereas the sheet S2 is continuously conveyed in the arrow D direction. As illustrated in FIG. 5C, after the sheet S1 reaches the position at which the sheet S1 is nipped between the reconveying rollers 16, the solenoid 27 is turned OFF to cancel the drive of the upper roller 12b.

Figure 5D:
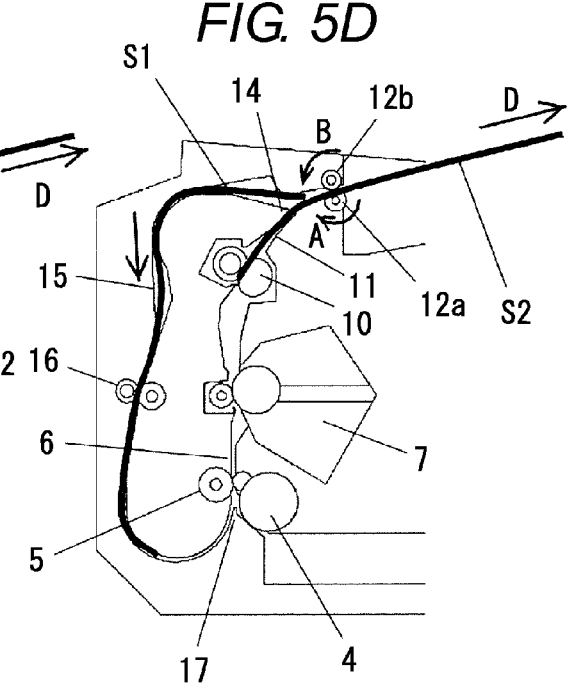

Accordingly, the upper roller 12b rotates in the arrow C direction by the friction between the upper roller 12b and the sheet S1 that is being conveyed by the reconveying rollers 16. As illustrated in FIG. 5D, when the trailing edge of the sheet S1 exits the sheet discharging roller pair 12, the upper roller 12b abuts against the sheet S2. At this time, because the drive of the upper roller 12b is canceled, the upper roller 12b subsequently rotates in the arrow B direction by the friction between the upper roller 12b and the sheet S2 that is being conveyed in the arrow D direction. As described above, according to the drive mechanism of this embodiment, the first sheet S1 and the second sheet S2 can be conveyed to pass each other by the sheet discharging roller pair 12.

Figure 6A:
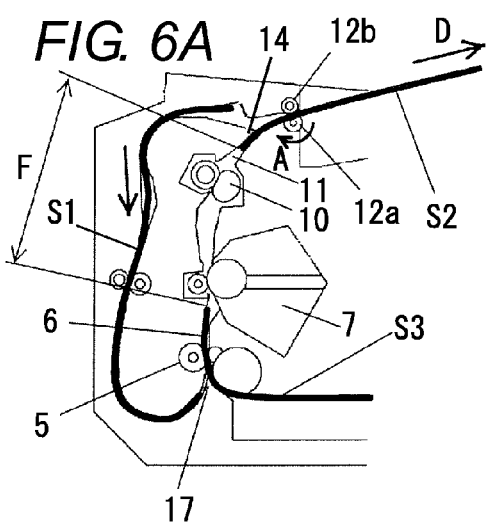
FIGS. 6A, 6B, 6C, 6D, and 6E are third explanatory views illustrating the operation of the sheet conveying apparatus at the time of successive duplex image formation.
Figure 6B:
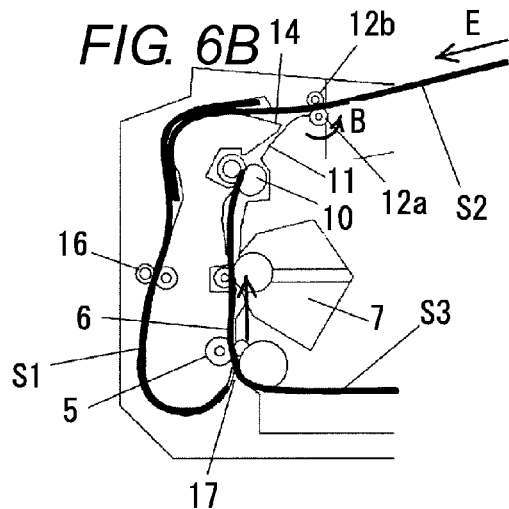

After the sheet S1 exits the sheet discharging roller pair 12, the sheet S1 is subsequently conveyed along the reconveying passage 15. At this time, as illustrated in FIG. 6A, a third sheet S3 passes through the conveying path 6 at the interval F from the sheet S2. Therefore, the control portion 50 controls the reconveying motor 52 to temporarily stop the reconveying rollers 16 at a position immediately before the leading edge of the sheet S1 reaches the junction point 17, to thereby stop the sheet S1. Note that, in the case where the sheet S1 is stopped as described above, when the sheet S2 is subsequently fed backward by the sheet discharging roller pair 12, as illustrated in FIG. 6B, the two sheets, that is, the sheet S1 that is being stopped and the sheet S2 that is being conveyed in the arrow E direction, are in a state of being overlaid one on another in the reconveying passage 15.

Figure 6C:
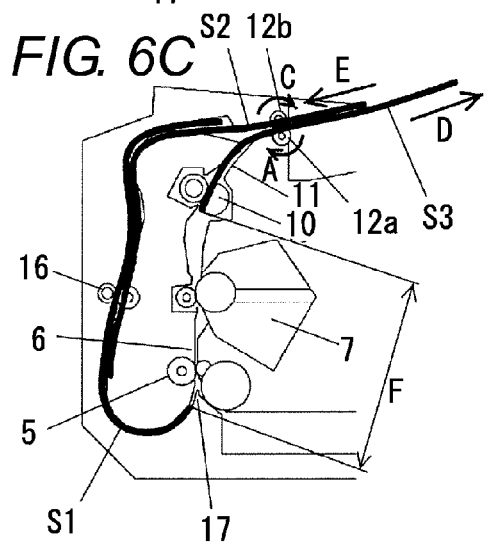

When the sheet S3 reaches the sheet discharging roller pair 12, the sheet discharging roller pair 12 is operated similarly to the case of the sheet S1 and the sheet S2, with the result that the sheet S2 conveyed in the arrow E direction and the sheet S3 conveyed in the arrow D direction, which are illustrated in FIG. 6C, pass each other. After a trailing edge of the sheet S3 passes through the junction point 17, the reconveying motor 52 drives the reconveying rollers 16 to resume conveying the sheet S1 at the predetermined interval F. Accordingly, the sheet S1 is sent to the conveying path 6 in the state in which the front side and the back side of the sheet S1 is reversed, and image formation for the back side of the sheet S1 is performed by the image forming portion 1B and the fixing portion 10.

Figure 6D:
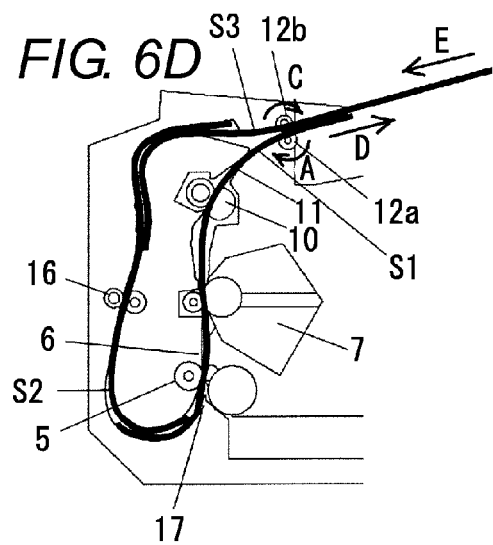

As illustrated in FIG. 6D, when the leading edge of the sheet S1 reaches the sheet discharging roller pair 12, the sheet discharging roller pair 12 is operated as described above, with the result that the sheet S1 is conveyed again in the arrow D direction with the sheet S1 and the sheet S3 conveyed in the arrow E direction passing each other. Subsequently, the lower roller 12a is continuously rotated in the arrow A direction to discharge, as illustrated in FIG. 6E, the sheet S1 onto the sheet discharge tray 13 without the front side and the back side of the sheet S1 being reversed.

Figure 6E:
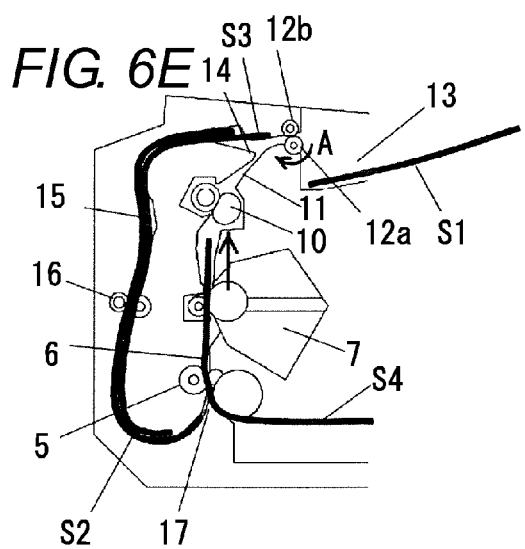

Further, as illustrated in FIG. 6E, a fourth sheet S4 is fed successively after the sheet S1. At this time, similarly to the case of the sheet S1, the sheet S2 stands by in the reconveying passage 15 at the position immediately before the leading edge of the sheet S2 reaches the junction point 17. After a trailing edge of the sheet S4 passes through the junction point 17, the conveyance of the sheet S2 is resumed, and the image formation for the back side of the sheet S2 is performed. Subsequently, the cycle of the above-mentioned operations is repeated.

As described above, in this embodiment, when the sheet S1 (preceding sheet) is conveyed toward the reconveying passage 15 by the sheet discharging roller pair 12, the conveyed sheet S1 and the sheet S2 (succeeding sheet) pass each other. Because the two sheets are thus conveyed to pass each other by the sheet discharging roller pair 12 alone, the successive duplex image formation can be performed with no decrease in productivity. Note that, in this embodiment, the sheet discharging roller pair 12 nips and conveys the sheets, and the sheets may similarly be conveyed to pass each other even in a case of using a comb-teeth type roller pair, in which upper and lower rollers are axially arranged in a staggered pattern to distort and convey the sheets.

Further, the description of this embodiment is directed to the case where the lower roller 12a is rotatable in both directions. Alternatively, the lower roller 12a may at least be configured so that the lower roller 12a is drivable only in the arrow A direction and the drive thereof may be canceled. In this case, when the sheet is conveyed in the arrow E direction before the sheets are conveyed to pass each other (in the state of FIG. 4C), the upper roller 12b may be driven whereas the drive of the lower roller 12a is canceled, to thereby convey the sheet by the upper roller 12b, after which the sheets may similarly be conveyed to pass each other. Further, the upper roller 12b may be configured to be rotatable in both directions, but only needs to be rotatable at least in the arrow C direction.

Further, the description of this embodiment is directed to the operation of conveying the preceding sheet in the arrow D direction before the succeeding sheet reaches the sheet discharging roller pair 12. Alternatively, the conveyance of the preceding sheet may be stopped temporarily before the succeeding sheet reaches the sheet discharging roller pair 12, and after the succeeding sheet reaches the sheet discharging roller pair 12, the drive of the sheet discharging roller pair 12 may be resumed to convey the preceding sheet and the succeeding sheet in the arrow D direction.

Further, in this embodiment, as illustrated in FIG. 6A, the sheet S1 stands by at the position immediately before the junction point 17 to feed the sheet S3 ahead of the sheet S1. Alternatively, the sheet S1 may be sent into the conveying path 6 successively after the sheet S2 without the stop.

Figure 7A:
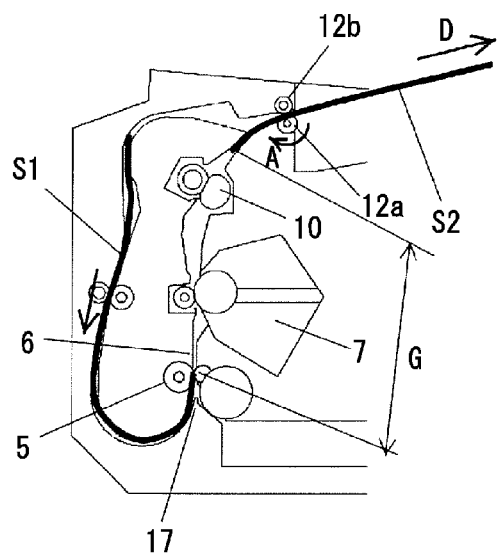
FIGS. 7A, 7B, 7C, and 7D are explanatory views illustrating an operation of the sheet conveying apparatus at the time of successive duplex image formation according to a second embodiment of the present invention.

Next, a second embodiment of the present invention, which provides another operation for the case as described above, will be described. Specifically, in this embodiment, as illustrated in FIG. 7A, after the sheet S1 and the sheet S2 are conveyed to pass each other, the sheet S1 that enters the reconveying passage 15 is sent into the conveying path 6 successively after the sheet S2 without the stop. At this time, an interval G, which is larger than the interval F for the case of the second and subsequent sheets, is set as the interval between a trailing edge of the sheet S2 and the leading edge of the sheet S1.

Figure 7B:
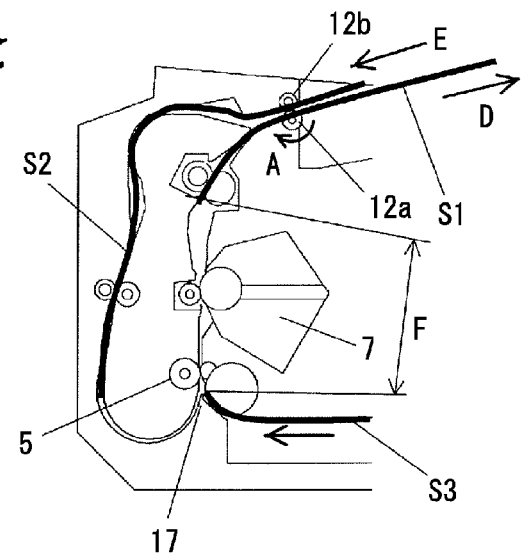
Figure 7C:
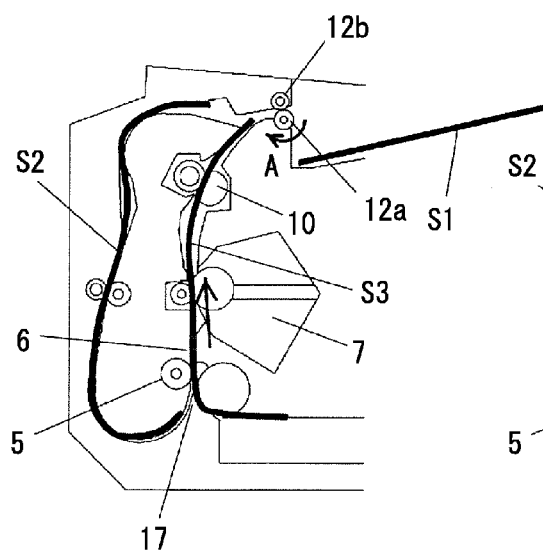

As illustrated in FIG. 7B, the third sheet S3 is fed at the interval F from the sheet S1. At this time, the sheet S2 is conveyed in the reconveying passage 15, and as illustrated in FIG. 7C, the sheet S2 is subsequently stopped and stands by at the position immediately before the leading edge thereof reaches the junction point 17. At this time, the sheet S1 is already discharged onto the sheet discharge tray 13.

Figure 7D:
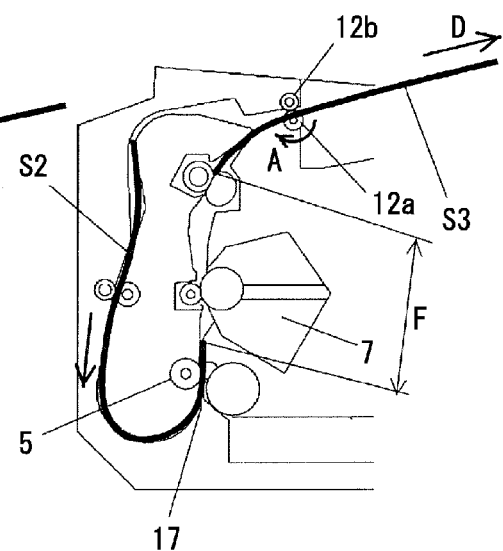

As illustrated in FIG. 7D, the conveyance of the sheet S2 is subsequently resumed at the predetermined interval F from the trailing edge of the sheet S3. At this time, only the sheet S2 is present in the reconveying passage. Subsequently, the fourth sheet S4 is fed successively after the sheet S2, the sheet S3 stands by at the position immediately before the junction point 17, and the conveyance of the sheet S3 is resumed successively after the sheet S4. Such a cycle is repeated.

As described above, by sending the sheet S1 into the conveying path 6 successively after the sheet S2 without the stop, the two sheets do not need to stand by in the reconveying passage 15. Therefore, the successive duplex image formation can be performed through simpler control with no decrease in productivity.

Next, a third embodiment of the present invention will be described. FIGS. 8A, 8B, 8C, and 8D are explanatory views illustrating a structure of a sheet conveying apparatus 1E according to this embodiment. In FIGS. 8A to 8D, the same reference symbols as those in FIGS. 4A to 4D described above represent the same or corresponding parts.

Figure 8A:
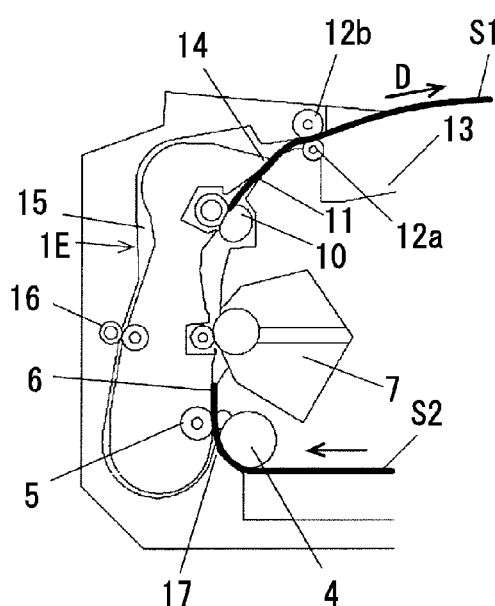
FIGS. 8A, 8B, 8C, and 8D are explanatory views illustrating an operation of a sheet conveying apparatus at the time of successive duplex image formation according to a third embodiment of the present invention.

In this embodiment, as illustrated in FIG. 8A, a diameter of the upper roller 12b of the sheet discharging roller pair 12 is set larger than a diameter of the lower roller 12a of the sheet discharging roller pair 12. Further, a gear ratio of the lower roller 12a to the upper roller 12b is set to 1:1. Accordingly, at the same rotating speed, a circumferential speed of the upper roller 12b is higher than a circumferential speed of the lower roller 12a.

Figure 8B:
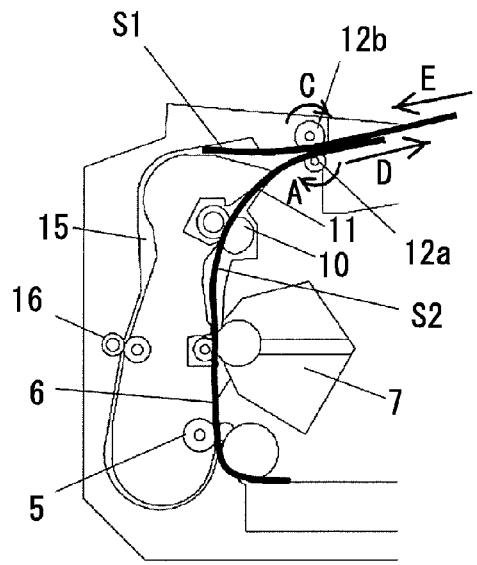

FIG. 8B illustrates a state in which the drive is transmitted to the upper roller 12b so that the first sheet S1 and the second sheet S2 are conveyed to pass each other by the sheet discharging roller pair 12. At this time, the sheet conveying speed of the sheet S1 is higher than the sheet conveying speed of the sheet S2 depending on the ratio of the upper roller 12b to the lower roller 12a. In this case, the speed ratio is set under the following condition. That is, the sheet S1 and the sheet S2 are conveyed at such speeds that the above-mentioned larger interval G of FIG. 7A between the leading edge of the sheet S1 and the trailing edge of the sheet S2 becomes the smaller interval F within a period in which the sheet S1 is conveyed by the upper roller 12b.

Figure 8C:
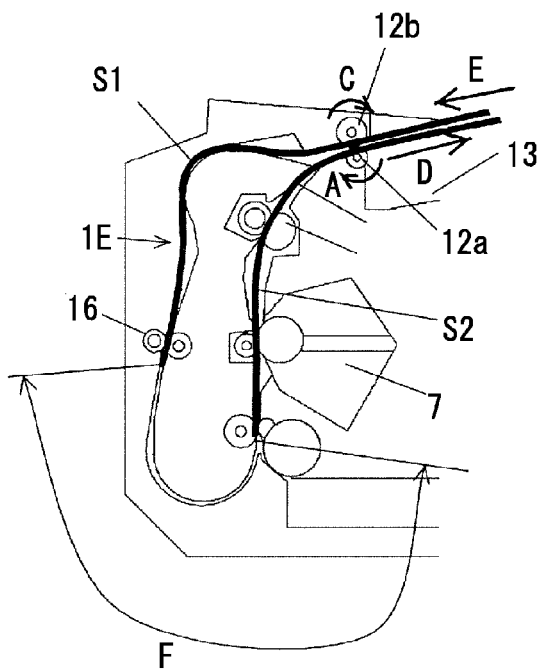

After the sheet S1 and the sheet S2 start to be conveyed to pass each other at a position of FIG. 8B, the sheet S1 is accordingly conveyed at a sheet conveying speed higher than that of the sheet S2. Then, at a timing to cancel the drive to the upper roller 12b, as illustrated in FIG. 8C, the sheet S1 is conveyed to a position at which the leading edge of the sheet S1 is spaced by the interval F from the trailing edge of the sheet S2. Subsequently, the sheet S1 is sent to the image forming portion at the predetermined interval F successively after the sheet S2 without the temporary stop at the junction point 17, and the image formation for the back side of the sheet S1 is performed.

Figure 8D:
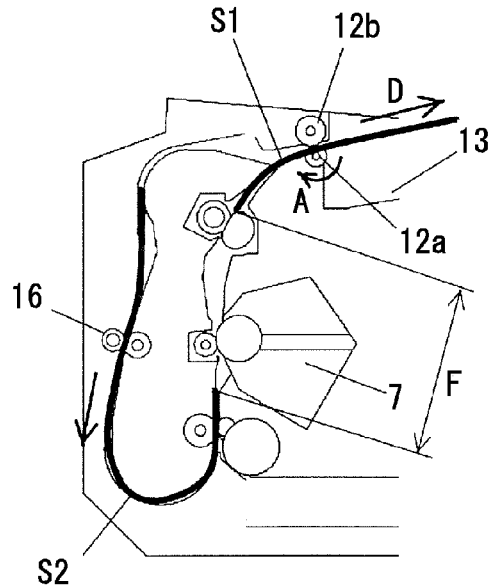

Further, as illustrated in FIG. 8D, the sheet S2 is conveyed at a higher speed similarly to the case of the sheet S1 so that the interval between the leading edge of the sheet S2 and the trailing edge of the sheet S1 becomes the smaller interval F. Then, the image formation for the back side of the sheet S2 is performed successively after the sheet S1. Subsequently, the third sheet S3 is fed at the interval F from the trailing edge of the sheet S2 that is undergoing the image formation for the back side of the sheet S2, and a similar process is repeated so that the successive image formation can be continued.

As described above, in this embodiment, the sheet conveying speed at the time of driving the upper roller is set higher than that at the time of driving the lower roller 12a. Thus, the sheet S1 can be sent into the conveying path 6 successively after the sheet S2 without the stop and without any increase in sheet interval to the interval G. Accordingly, through the above-mentioned simple operation as in the second embodiment, the successive duplex image formation can be performed with no further decrease in productivity in the first sheet.

Note that, in this embodiment, the diameter of the upper roller 12b is set larger than that of the lower roller 12a in the state in which the gear ratio is 1:1, to thereby increase the sheet conveying speed, and the sheet conveying speed may similarly be increased according to an arbitrary gear ratio and the relationship between the roller diameters. Further, in a case where the upper roller 12b is driven by a dedicated motor, needless to say, the sheet conveying speed may be changed through control of the motor.

Figure 9:
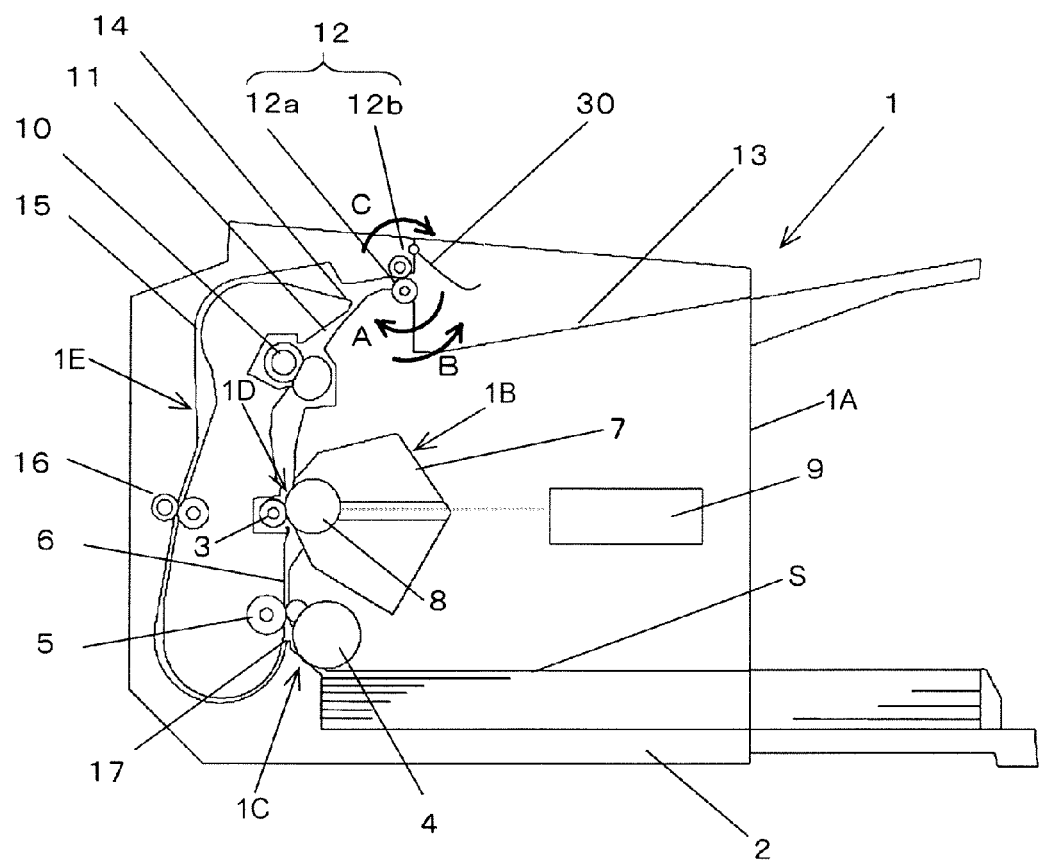
FIG. 9 is a view illustrating a schematic structure of a laser beam printer as an example of an image forming apparatus including a sheet conveying apparatus according to a fourth embodiment of the present invention.

Next, a fourth embodiment of the present invention will be described. FIG. 9 is a view illustrating a schematic structure of a laser beam printer as an example of an image forming apparatus including a sheet conveying apparatus 1E according to this embodiment. In FIG. 9, the same reference symbols as those in FIG. 1 described above represent the same or corresponding parts.

Figure 10:
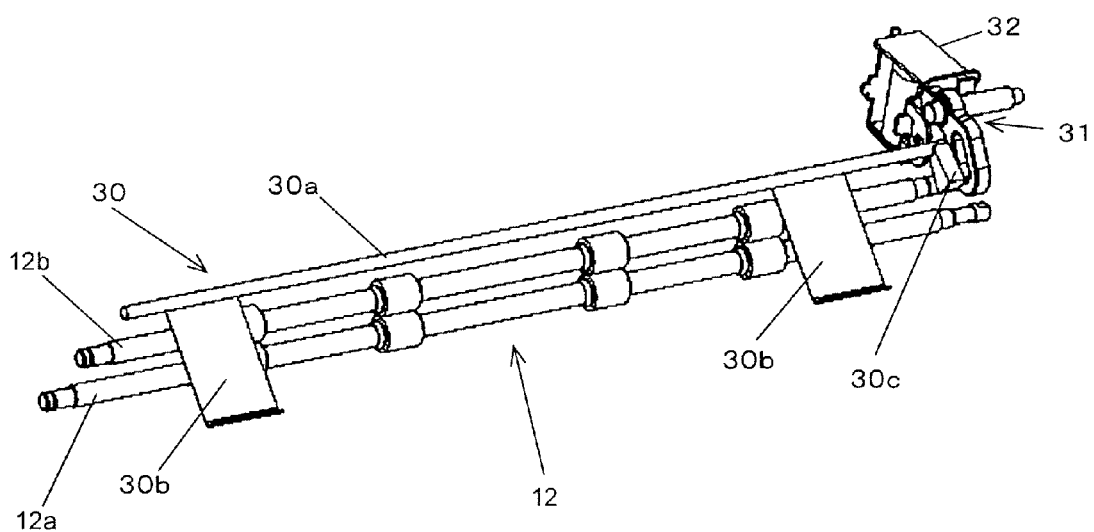
FIG. 10 is an explanatory view illustrating a structure of a sheet presser provided in the sheet conveying apparatus.

In FIG. 9, the sheet conveying apparatus 1E includes a sheet presser 30, which is a sheet pressing portion which presses the sheet discharged onto the sheet discharge tray 13 to suppress curls of the sheet. The sheet presser 30 is pivotably arranged on the downstream side of the sheet discharging roller pair 12 in the sheet discharging direction. The sheet presser 30 pivots in a vertical direction through a link 31 by a solenoid 32 as a drive source as shown in FIG. 10. Further, the sheet presser 30 includes a shaft portion 30a, which is a pivotal center, a pressing plate 30b as a sheet pressing member fixed to the shaft portion 30a for pressing the sheet, and a sheet presser joint 30c coupled to the link 31, for receiving rotational torque for rotating the shaft portion 30a.

Figure 11A:
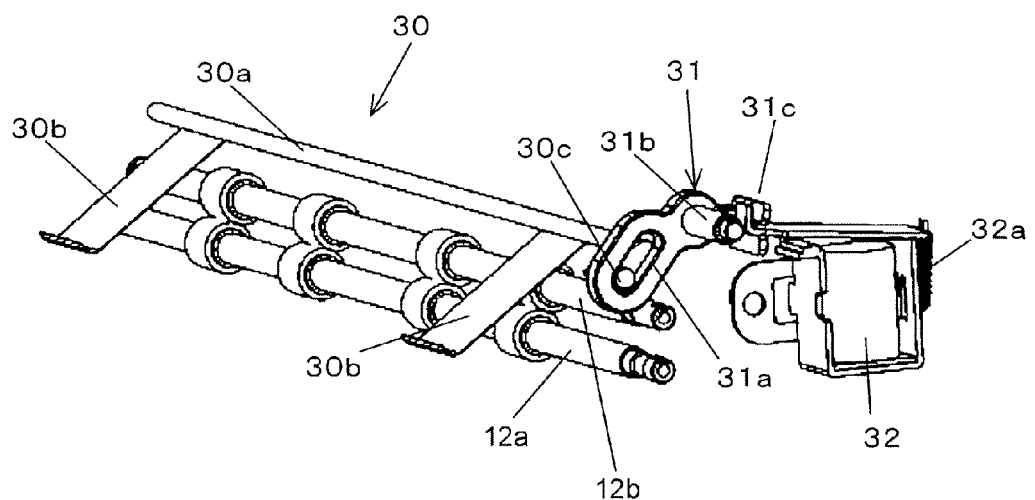
FIGS. 11A and 11B are explanatory views illustrating an operation of the sheet presser provided in the sheet conveying apparatus.
Figure 11B:
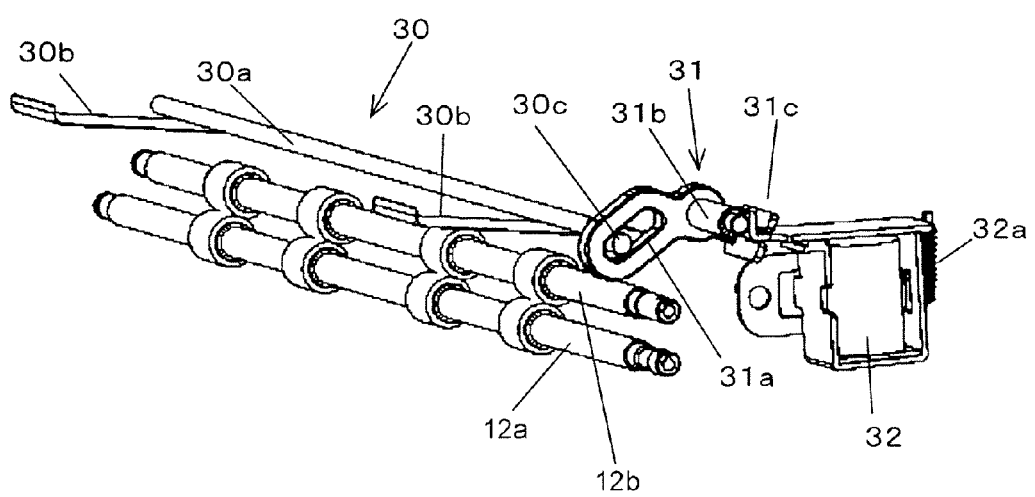

As illustrated in FIGS. 11A and 11B, the link 31 is arranged so as to be freely pivotable about a pivot shaft 31b, and at one pivotal end of the link 31, there is provided a first connecting portion 31a, to which the sheet presser joint 30c is coupled. Further, at the other pivotal end of the link 31, there is provided a second connecting portion 31c, which is coupled to the solenoid 32.

For example, in a case where the sheet presser 30 situated at a sheet pressing position of FIG. 11A is retreated to a retreat position, the solenoid 32 is turned ON. Therefore, the first connecting portion 31a of the link 31 is raised, and accordingly the sheet presser joint 30c is raised. As a result, the sheet presser 30 moves to the retreat position of FIG. 11B.

On the other hand, in a case where the sheet presser 30 situated at the retreat position of FIG. 11B is moved to the sheet pressing position of FIG. 11A, the solenoid 32 is turned OFF. Therefore, the first connecting portion 31a of the link 31 is lowered by a biasing unit 32a, which is provided to the solenoid 32, and accordingly the sheet presser joint 30c is lowered. As a result, the sheet presser 30 moves to the sheet pressing position. Note that, the sheet presser 30 may move to the sheet pressing position by its own weight.

Figure 12A:
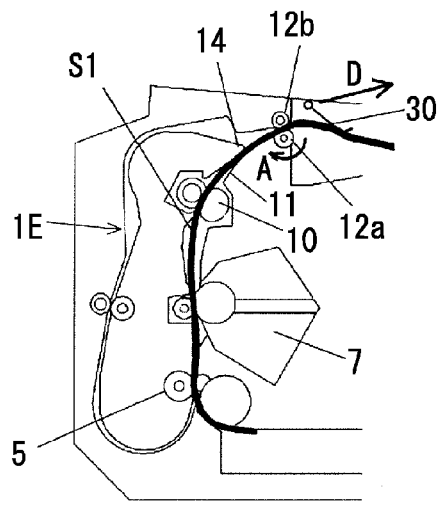
FIGS. 12A, 12B, 12C, and 12D are first explanatory views illustrating an operation of the sheet conveying apparatus at the time of successive duplex image formation.

Next, an operation of the sheet conveying apparatus 1E including the sheet presser 30 structured as described above, which is movable between the sheet pressing position and the retreat position, at the time of successive duplex image formation will be described. Before starting the duplex printing conveying operation, as illustrated in FIG. 12A, the lower roller 12a rotates in the arrow A direction (clockwise direction) so as to convey the first sheet S1. At this time, the drive of the upper roller 12b is canceled, and accordingly the upper roller 12b rotates in the arrow B direction (counterclockwise direction) in association with the rotation of the lower roller 12a. Further, at this time, the sheet presser 30 is situated at the sheet pressing position by turning OFF the solenoid 32, and hence the sheet presser 30 is in a state of pressing a curled sheet.

Figure 12B:
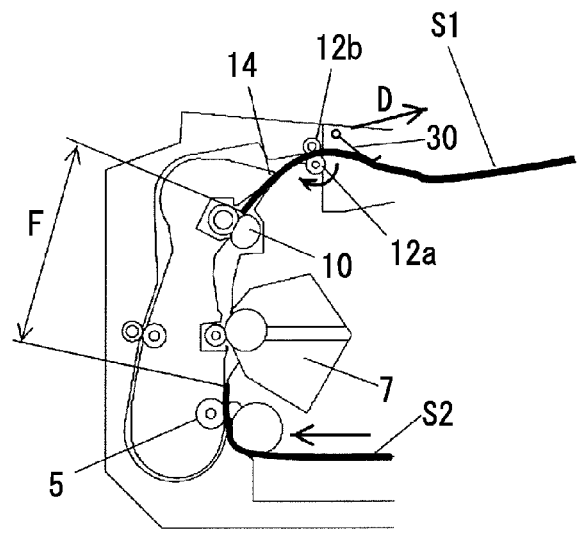

When the first sheet S1 reaches the sheet discharging roller pair 12 via the sheet discharge conveying path 11, the sheet discharging roller pair 12 nips the sheet S1 to convey the sheet S1 in the arrow D direction. In the case of the successive sheet feeding operation, as illustrated in FIG. 12B, the second sheet S2 is conveyed at the predetermined interval F from the trailing edge of the sheet S1.

Figure 12C:
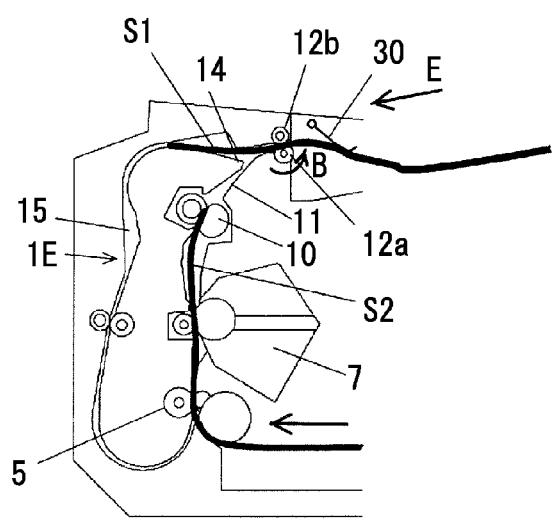

When the trailing edge of the sheet S1 passes through the branch point 14 between the sheet discharge conveying path 11 and the reconveying passage 15, the solenoid 21 is turned ON, and as illustrated in FIG. 12C, the rotation direction of the lower roller 12a is switched to the arrow B direction. Accordingly, the sheet S1 is conveyed in the arrow E direction with the former trailing edge side as the leading edge, and the sheet S1 is sent to the reconveying passage 15. In this case, the sheet S2 is conveyed at the predetermined interval F from the sheet S1. Because the interval is short, the leading edge of the sheet S2 reaches the sheet discharging roller pair 12 while the sheet S1 is being conveyed in the arrow E direction.

Figure 12D:
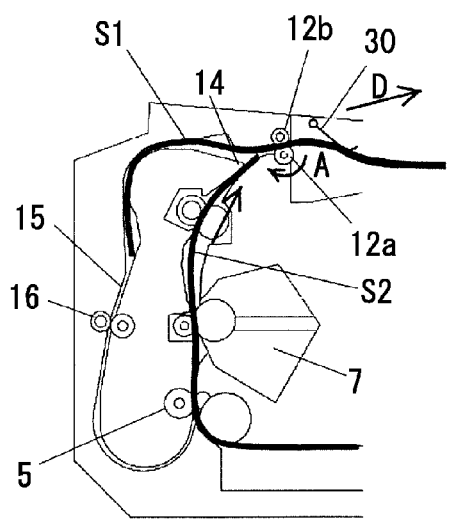

At this time, in this embodiment, in order to convey the sheets to pass each other, as illustrated in FIG. 12D, immediately before the leading edge of the sheet S2 reaches the sheet discharging roller pair 12, the drive direction of the lower roller 12a is first switched to the arrow A direction, with the result that the sheet S1 is conveyed in the arrow D direction.

When the two sheets are subsequently conveyed to pass each other, if the sheet presser 30 is situated at the sheet pressing position, the resistance of friction between the sheet S1 and the sheet S2 is adversely increased, and further, the sheet presser 30 is regarded to have a resistance against the force applied by the upper roller 12b to convey the sheet S1. In this case, the abrasive force exerted on the toner images formed on the respective sheets S1 and S2 is increased, with the result that the image quality is degraded. Further, the posture of the sheet S1 becomes unstable, and therefore the sheet S1 is jammed in the midst of the conveying path. As in this case, the sheet conveying control falls out of the intended operation range, and consequently the desired image forming operation cannot be performed.

Figure 13A:
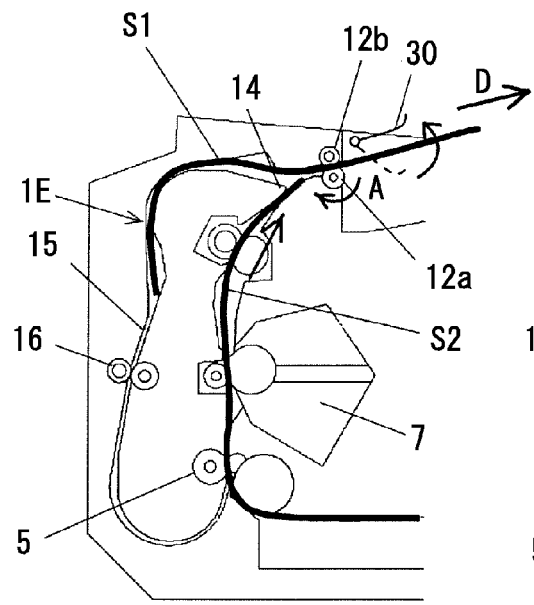
FIGS. 13A, 13B, 13C, and 13D are second explanatory views illustrating the operation of the sheet conveying apparatus at the time of successive duplex image formation.

In view of the above, when the two sheets nipped by the sheet discharging roller pair 12 are conveyed to pass each other, the solenoid 32 is turned ON to retreat the sheet presser 30 to the retreat position. In this embodiment, as illustrated in FIG. 13A, the sheet presser 30 is moved from the sheet pressing position to the retreat position immediately after the sheet S2 reaches the sheet discharging roller pair 12.

Figure 13B:
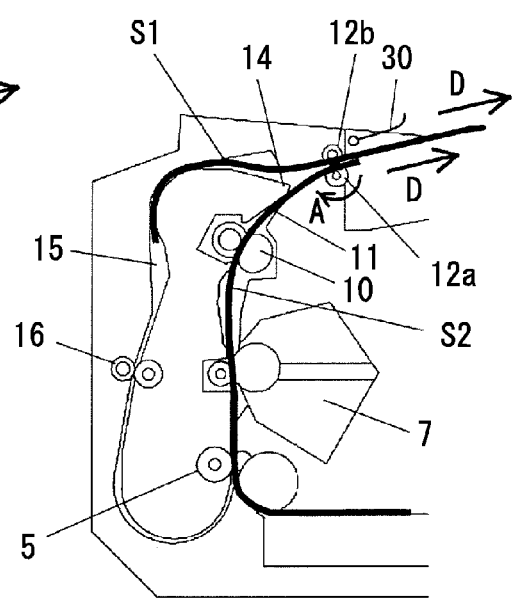

Subsequently, the sheet S2 is sent between the lower roller 12a and the sheet S1 that is being conveyed in the arrow D direction, and as illustrated in FIG. 13B, the two sheets S1 and S2 are conveyed in the arrow D direction. At this time, because the sheet presser 30 moves to the retreat position, the conveyance of the sheets is not hindered. In this embodiment, the retreat position is set as a position at which the sheet presser 30 does not come into contact with the sheet when the sheet presser 30 moves, but alternatively, the retreat position may be set as a position at which the sheet presser 30 comes into contact with the sheet as long as the image quality degradation and the conveying resistance do not occur when the sheets pass each other.

Figure 13C:
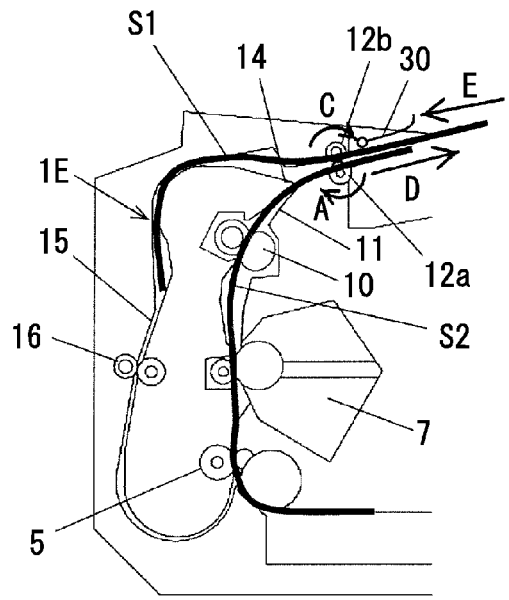
Figure 13D:
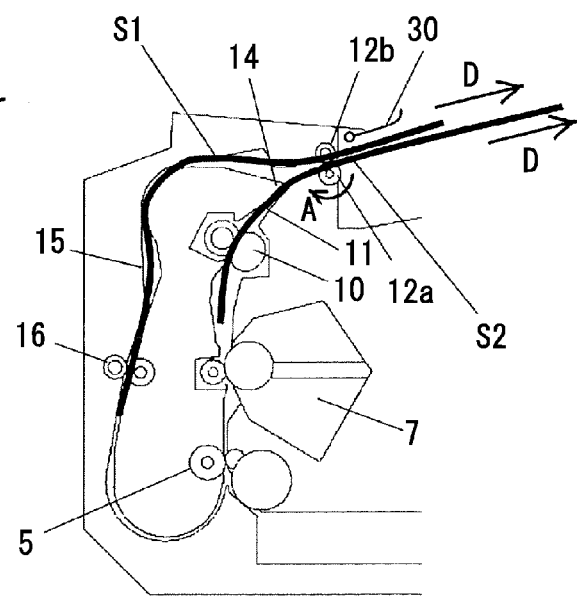

After the sheet S2 is securely nipped by the sheet discharging roller pair 12, as illustrated in FIG. 13C, the solenoid 27 is driven to rotate the upper roller 12b in the arrow C direction. At this time, because the frictional force of the sheet discharging roller pair 12 is larger than the frictional force between the sheets, only the sheet S1 is conveyed in the arrow E direction by the upper roller 12b, whereas the sheet S2 is continuously conveyed in the arrow D direction. As illustrated FIG. 13D, after the sheet S1 reaches the position at which the sheet S1 is nipped between the reconveying rollers 16, the solenoid 27 is turned OFF to cancel the drive of the upper roller 12b. Even when the drive is canceled as described above, the upper roller 12b rotates in the arrow C direction by the friction between the upper roller 12b and the sheet S1 that is being conveyed by the reconveying rollers 16.

Subsequently, the trailing edge of the sheet S1 conveyed by the reconveying rollers 16 exits the sheet discharging roller pair 12, and at this time, the solenoid 32 is turned OFF. Accordingly, as illustrated in FIG. 14A, the sheet presser 30 moves from the retreat position to the sheet pressing position. Because the sheet presser 30 moves to the sheet pressing position as described above, the curls of the sheet stacked on the sheet discharge tray 13 are suppressed, which can prevent the sheet from being pushed and also prevent a jam from occurring.

Further, when the trailing edge of the sheet S1 exits the sheet discharging roller pair 12, as illustrated in FIG. 14B, the upper roller 12b abuts against the sheet S2. As a result, the upper roller 12b rotates in the arrow B direction by the friction between the upper roller 12b and the sheet S2 that is being conveyed in the arrow D direction. As described above, according to the drive mechanism of this embodiment, the first sheet S1 and the second sheet S2 can be conveyed to pass each other by the sheet discharging roller pair 12.

Subsequently, the sheet S1 is conveyed along the reconveying passage 15, and at this time, as illustrated in FIG. 14C, the third sheet S3 passes through the conveying path 6 at the interval F from the sheet S2. Therefore, the sheet S1 is temporarily stopped at the position immediately before the leading edge of the sheet S1 reaches the junction point 17. Note that, in the case where the sheet S1 is stopped as described above, when the sheet S2 is subsequently fed backward by the sheet discharging roller pair 12, as illustrated in FIG. 14D, the two sheets, that is, the sheet S1 that is being stopped and the sheet S2 that is being conveyed in the arrow E direction, are in the state of being overlaid one on another in the reconveying passage 15.

When the sheet S3 reaches the sheet discharging roller pair 12, the solenoid 32 is subsequently driven similarly to the case of the sheet S1 and the sheet S2, with the result that, as illustrated in FIG. 15A, the sheet presser 30 moves from the sheet pressing position to the retreat position. Further, the sheet discharging roller pair 12 is operated, with the result that the sheet S2 conveyed in the arrow E direction and the sheet S3 conveyed in the arrow D direction, which are illustrated in FIG. 15B, pass each other.

After the trailing edge of the sheet S3 passes through the junction point 17, as illustrated in FIG. 15C, the reconveying rollers 16 are driven to resume conveying the sheet S1 at the predetermined interval F. Accordingly, the sheet S1 is sent to the conveying path 6 in the state in which the front side and the back side of the sheet S1 is reversed, and the image formation for the back side of the sheet S1 is performed by the image forming portion 1B and the fixing portion 10.

When the leading edge of the sheet S1 reaches the sheet discharging roller pair 12, the sheet discharging roller pair 12 is subsequently operated as described above, with the result that the sheet S1 is conveyed again in the arrow D direction with the sheet S1 and the sheet S3 conveyed in the arrow E direction passing each other. Subsequently, the sheet S1 illustrated in FIG. 15D is discharged onto the sheet discharge tray 13 without the front side and the back side of the sheet S1 being reversed.

At this time, when the sheet S3 that is continuously conveyed to the reconveying passage 15 exits the sheet discharging roller pair 12, the solenoid 32 is turned OFF to move the sheet presser 30 from the retreat position to the sheet pressing position. Accordingly, even if the sheet S1 stacked on the sheet discharge tray 13 is curled to block the sheet discharging roller pair 12 on the downstream side in the sheet discharging direction, the sheet presser 30 presses the sheet S1 against the sheet discharge tray 13, which can prevent the sheet from being pushed and also prevent a jam from occurring.

Further, as illustrated in FIG. 15E, the fourth sheet S4 is fed successively after the sheet S1. At this time, similarly to the case of the sheet S1, the sheet S2 stands by in the reconveying passage 15 at the position immediately before the leading edge of the sheet S2 reaches the junction point 17. After the trailing edge of the sheet S4 passes through the junction point 17, the conveyance of the sheet S2 is resumed, and the image formation for the back side is performed. Subsequently, the cycle of the above-mentioned operations is repeated.

As described above, in this embodiment, the sheet presser 30 is moved to the retreat position when the two sheets are conveyed to pass each other for the successive duplex image formation. Accordingly, the sheet reversing operation can be performed more stably with no image quality degradation.

Note that, in this embodiment, even in the case of using a comb-teeth type roller pair, in which upper and lower rollers are axially arranged in a staggered pattern to distort and convey the sheets, the sheets may similarly be conveyed to pass each other. In the case of using the comb-teeth type roller pair, the sheet conveying force tends to be smaller, and hence the effects of the present invention are further enhanced.

Further, the description of this embodiment is directed to the operation of conveying the preceding sheet in the arrow D direction before the succeeding sheet reaches the sheet discharging roller pair 12. However, the conveyance of the preceding sheet may be stopped temporarily before the succeeding sheet reaches the sheet discharging roller pair 12, and after the succeeding sheet reaches the sheet discharging roller pair 12, the drive of the sheet discharging roller pair 12 may be resumed to convey the preceding sheet and the succeeding sheet in the arrow D direction. At this time, the sheet presser 30 only needs to move to the retreat position in keeping with the resumption of the drive of the sheet discharging roller pair 12 for conveying the two sheets, that is, the preceding sheet and the succeeding sheet, in the arrow D direction by the sheet discharging roller pair 12.

Further, in this embodiment, the sheet presser 30 moves from the sheet pressing position to the retreat position immediately after the leading edge of the succeeding sheet (for example, sheet S2 in the case where the sheet S1 and the sheet S2 are conveyed to pass each other) reaches the sheet discharging roller pair 12. However, the sheet presser 30 may move to the retreat position until the sheet comes into contact with the sheet presser 30 situated at the sheet pressing position. However, the timing of contact differs depending on properties of the sheet (fiber orientation and density of the paper), and hence it is preferred that, as in this embodiment, the sheet presser 30 move to the retreat position immediately after the leading edge of the succeeding sheet reaches the sheet discharging roller pair 12.

Further, in this embodiment, the sheet presser 30 moves from the retreat position to the sheet pressing position when the preceding sheet (for example, sheet S1 in the case where the sheet S1 and the sheet S2 are conveyed to pass each other) exits the sheet discharging roller pair 12. However, the sheet presser 30 may move to the sheet pressing position within a period immediately after the contact between the sheet and the sheet presser 30 remaining at the sheet pressing position is released until the sheet exits the sheet discharging roller pair 12. However, the timing to release the contact differs depending on the properties of the sheet (fiber orientation and density of the paper), and hence it is preferred that, as in this embodiment, the sheet presser 30 move to the sheet pressing position when the preceding sheet exits the sheet discharging roller pair 12.

Note that, the following operation may be employed in a case where the preceding sheet and the succeeding sheet are conveyed in the same direction at substantially the same speed, during which the image quality degradation and the conveying resistance may be ignored even if the sheet presser 30 remains at the sheet pressing position. That is, the sheet presser 30 is moved from the sheet pressing position to the retreat position at a timing corresponding to the timing to switch the conveying direction of the preceding sheet to the reverse direction with the succeeding sheet being conveyed in the forward direction.

Further, the sheet presser 30 of this embodiment is also applicable to the second and third embodiments, in which the sheet S1 is sent into the conveying path 6 successively after the sheet S2 without the stop. Even in this case, as in this embodiment, the sheet presser 30 only needs to be moved from the sheet pressing position to the retreat position in keeping with the timing when the two sheets pass each other.

Further, in this embodiment, as described above, the sheet presser 30 situated at the retreat position may come into contact with the sheet as long as the image quality degradation and the conveying resistance do not occur when the sheets pass each other. In view of this, when the sheets pass each other, the pressure applied to the sheet presser 30 may be reduced to such a level that no stress is applied between the two sheets, to thereby move the sheet presser 30 to the retreat position by the stiffness of the sheet. In this case, for example, the sheet presser 30 is biased by the biasing unit (not shown) to press the sheet, and the biasing force of the biasing unit is reduced in keeping with the timing when the two sheets are conveyed to pass each other, to thereby move the sheet presser to the retreat position.

Further, in this embodiment, the sheet presser 30 is formed integrally, but the respective components of the sheet presser 30 may be formed individually and coupled together. Further, as illustrated in, for example, FIG. 10, the pressing plate 30b of the sheet presser 30 is provided at two positions of the shaft portion 30a, but more pressing plates 30b may be provided, or a single long plate to be uniformly brought into contact with the sheet may be used as the pressing plate 30b.

Figure 16:
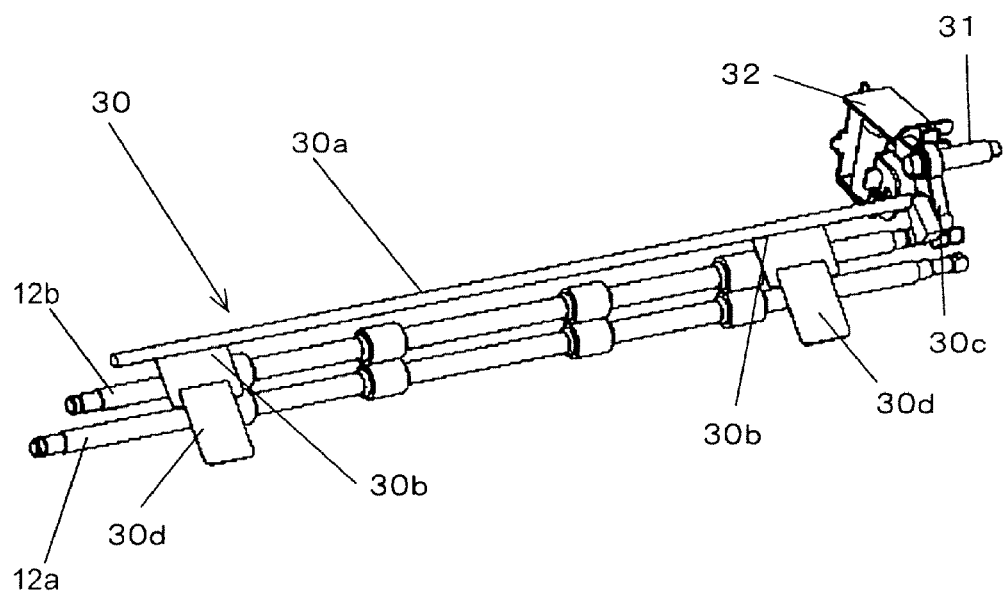
FIG. 16 is an explanatory view illustrating another structure of the sheet presser.

Further, a biasing unit such as a helical torsion spring (not shown) may be provided between the pressing plate 30b and the shaft portion 30a, and the stacked sheet may be pressed smoothly by the biasing force of the biasing unit. Further, as illustrated in FIG. 16, a part 30d of the pressing plate 30b to be brought into contact with the sheet may be formed of a flexible material, whereas the other part of the pressing plate 30b is formed of a substantially rigid member. Alternatively, the pressing plate itself may be formed of a flexible material to press the sheet smoothly.

Further, in this embodiment, the sheet presser 30 and the solenoid 32 are coupled to each other through a single member, that is, the link 31, but the sheet presser 30 and the solenoid 32 may be coupled to each other using multiple coupling members. Still, the link 31 may be omitted, and the solenoid 32 may be coupled directly to the sheet presser 30. Further, in this embodiment, the sheet presser 30 is driven by the solenoid 32 and the link 31, but a clutch (not shown) may be used as appropriate to drive the sheet presser 30 by the drive force branched from the drive force of the drive unit which drives another element such as the sheet discharging roller pair 12.

By the way, when the sheets are conveyed to pass each other as described above, in a case where the image formed on the sheet has a high coverage rate, or in a case where the sheet is, for example, cardboard that is lower in image fixing property, abrasion of images and peeling of images may occur. Therefore, in the case where such sheets are conveyed, it is preferred to separate the sheet discharging roller pair.

Next, a fifth embodiment of the present invention, in which the sheet discharging roller pair is separated in the case where the sheets are conveyed to pass each other as described above, will be described.

Figure 17:
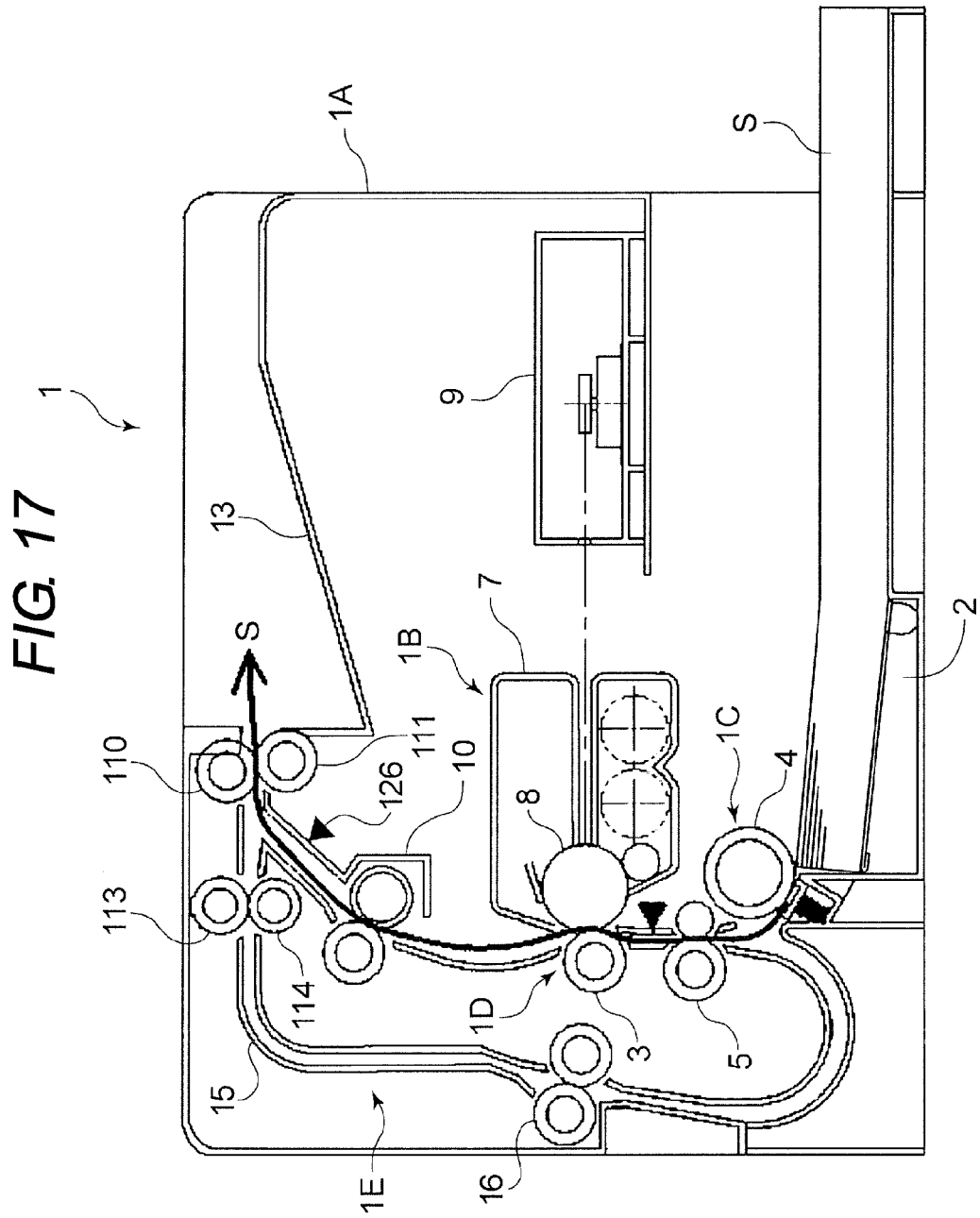
FIG. 17 is a view illustrating a schematic structure of a laser beam printer as an example of an image forming apparatus including a sheet conveying apparatus according to a fifth embodiment of the present invention.

FIG. 17 is a view illustrating a schematic structure of a laser beam printer as an example of an image forming apparatus including a sheet conveying apparatus according to this embodiment. In FIG. 17, the same reference symbols as those in FIG. 1 described above represent the same or corresponding parts. In FIG. 17, the sheet conveying apparatus includes a forward and reverse rotatable sheet discharging roller 110, and a sheet discharging rotatable member 111, which is provided so as to be brought into contact with and separated from the sheet discharging roller 110. Further, the sheet conveying apparatus includes a sheet reversing roller 113, which is a forward and reverse rotatable conveying roller provided in the reconveying passage 15, and a sheet reversing rotatable member 114, which is a conveying rotatable member to be driven in association with the sheet reversing roller 113. Note that, the rotation directions of the sheet discharging roller 110 and the sheet reversing roller 113 are switchable by the above-mentioned planetary gearing mechanisms of FIGS. 2A and 2B. Further, the sheet conveying apparatus includes a sheet discharge sensor 126, which is provided downstream of the fixing portion 10 in the conveying direction.

FIGS. 18A and 18B are explanatory views illustrating a separating mechanism 110A which separates the sheet discharging rotatable member 111 from the sheet discharging roller 110. The sheet discharging rotatable member 111 is held by a sheet discharging rotatable member holder 121 freely pivotable in the vertical direction, and is pressed against the sheet discharging roller 110 by a pressing unit (not shown). Further, the sheet discharging rotatable member holder 121 is supported so as to be freely pivotable in the vertical direction by a separating arm 124, which is fixed to a solenoid arm 123 engaging with a plunger 122a of a solenoid 122. Note that, a sheet discharging roller gear 115 is driven to perform forward and reverse rotation by the above-mentioned drive motor 18 of FIGS. 2A and 2B through a drive planetary gearing mechanism.

Accordingly, as illustrated in FIG. 18A, when the solenoid 122 is turned ON to rotate the separating arm 124 in an arrow C direction, the sheet discharging rotatable member holder 121 pivots downward, with the result that, as illustrated in FIG. 18B, the sheet discharging rotatable member 111 is separated from the sheet discharging roller 110. On a bottom surface of the separating arm 124, a flag-shaped member 124b is provided, and when the separating arm 124 rotates in the arrow C direction, a separation detecting sensor 125 serving as a detecting portion, such as a photo interrupter, is turned ON. Accordingly, the above-mentioned control portion 50 can detect that the sheet discharging rotatable member 111 enters the separated state.

Next, referring to FIGS. 19A to 19I, an operation of the sheet conveying apparatus 1E structured as described above at the time of successive duplex image formation will be described. When the successive duplex image formation operation is started, as illustrated in FIG. 19A, the first sheet S1 having an image formed on the first side is temporarily conveyed in the direction of the sheet discharge tray 13 through rotation of the sheet discharging roller 110 in the sheet discharging direction (arrow D direction of FIG. 19A). When the trailing edge of the sheet S1 passes through the sheet discharge sensor 126 and exits a branch point 14 after a predetermined period of time, as illustrated in FIG. 19B, the sheet discharging roller 110 subsequently rotates in the sheet reversing direction (arrow E direction of FIG. 19B) to convey the sheet S1 to the reconveying passage 15. At this time, the sheet reversing roller 113 also rotates in the sheet reversing direction (arrow E direction of FIG. 19B) to reverse and convey the sheet S1 together with the sheet discharging roller 110.

Subsequently, the second sheet S2 having an image formed on the first side is conveyed successively after the first sheet S1 at a predetermined interval. When the leading edge of the second sheet S2 is detected by the sheet discharge sensor 126, as illustrated in FIG. 19C, the sheet discharging roller 110 and the sheet reversing roller 113 first rotate (perform forward rotation) in the sheet discharging direction (arrow D direction of FIG. 19C). Accordingly, the first sheet S1 that is being reversed and conveyed is conveyed again in the direction of the sheet discharge tray 13. As illustrated in FIG. 19D, when the second sheet S2 is nipped between the sheet discharging roller 110 and the sheet discharging rotatable member 111 while being overlaid on the first sheet S1, as illustrated in FIG. 19E, the above-mentioned separating mechanism of FIGS. 18A and 18B subsequently separates the sheet discharging rotatable member 111 from the sheet discharging roller 110.

When the separation of the sheet discharging rotatable member 111 is detected by the separation detecting sensor 125 of FIGS. 18A and 18B, as illustrated in FIG. 19F, the sheet reversing roller 113 then rotates (performs reverse rotation) in the sheet reversing direction (arrow E direction of FIG. 19F) to reverse and convey the first sheet S1 again. At this time, the second sheet S2 is continuously conveyed in the direction of the sheet discharge tray 13 by the fixing portion 10, with the result that the first sheet S1 and the second sheet S2 are in the state of being conveyed to pass each other.

When the first sheet S1 that is being reversed and conveyed exits the sheet discharging roller 110, as illustrated in FIG. 19G, the sheet discharging rotatable member 111 and the sheet discharging roller 110 subsequently abut against each other to convey the second sheet S2 in the sheet discharging direction. Subsequently, as illustrated in FIG. 19H, the second sheet S2 is reversed and conveyed similarly to the case of the first sheet S1. When the first sheet S1 having an image formed on the second side reaches the sheet discharge sensor 126 successively after the second sheet S2, the first sheet S1 and the second sheet S2 are conveyed to pass each other as described above, and as illustrated in FIG. 19I, the first sheet S1 is subsequently discharged and stacked onto the sheet discharge tray 13. Subsequently, the second sheet S2 having an image formed on the second side is similarly discharged, and thus the duplex image formation for the two sheets is completed.

By repeating the above-mentioned operation, the successive image formation for the first side and the second side is subsequently repeated in an order of, for example, the third sheet S3 (first side) and the fourth sheet S4 (first side). Further, in this embodiment, the sheets start to be conveyed to pass each other based on detection information on the separation of the sheet discharging rotatable member 111. In other words, in this embodiment, the sheets are conveyed to pass each other in the state in which the sheet discharging rotatable member 111 is separated from the sheet discharging roller 110. Thus, when the sheets pass through the sheet discharging roller 110, there occurs no image defect due to surface sliding abrasion between the preceding sheet and the succeeding sheet.

Figure 20:
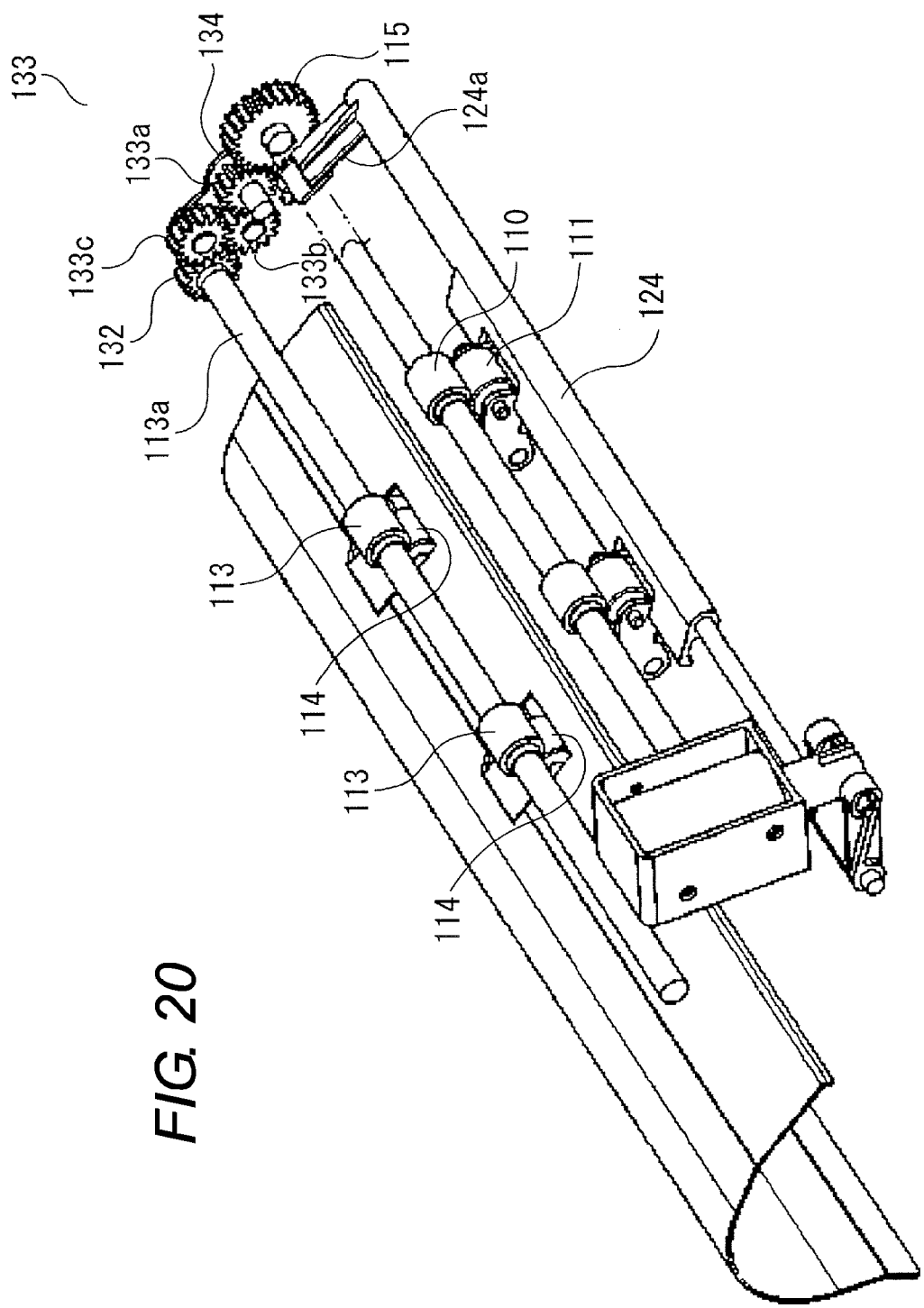
FIG. 20 is an explanatory view illustrating a drive mechanism for a sheet discharging roller and a sheet reversing roller of a sheet conveying apparatus according to a sixth embodiment of the present invention.

Next, a sixth embodiment of the present invention will be described. FIG. 20 is an explanatory view illustrating a drive mechanism for a sheet discharging roller 110 and a sheet reversing roller 113 of a sheet conveying apparatus according to this embodiment. In FIG. 20, the same reference symbols as those in FIGS. 18A and 18B described above represent the same or corresponding parts. In FIG. 20, the drive mechanism includes a sheet reversing roller gear 132, which is provided to a shaft 113a of the sheet reversing roller 113, and a switching unit 133, which is a switching portion which switches the rotation direction of the sheet reversing roller 113 by transmitting, to the sheet reversing roller gear 132, the drive of the sheet discharging roller gear 115 that performs forward and reverse rotation.

The switching unit 133 includes a gear holder 134 and three gears 133a to 133c. The gear holder 134 is provided so as to rotatably support the gears 133b and 133c, and to be rotatable about the gear 133a. Further, the gear holder 134 is held in contact with the above-mentioned separating arm 124 which separates the sheet discharging rotatable member 111 from the sheet discharging roller 110, and the rotation of the gear holder 134 is controlled by the separating arm 124.

Figure 21A:
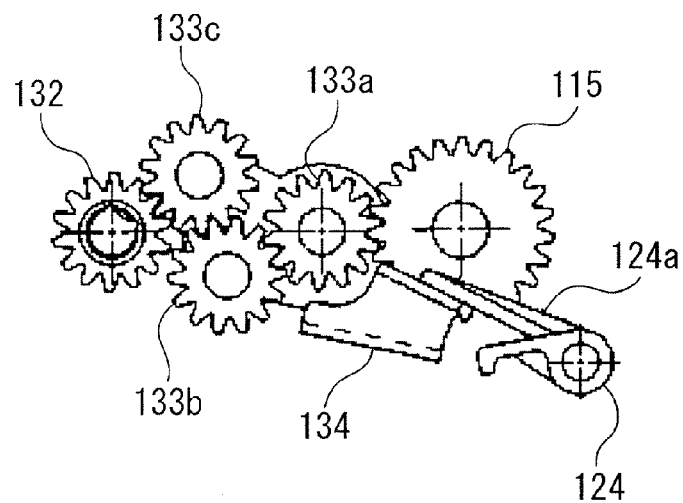
FIGS. 21A and 21B are explanatory views illustrating an operation of the drive mechanism.
Figure 21B:
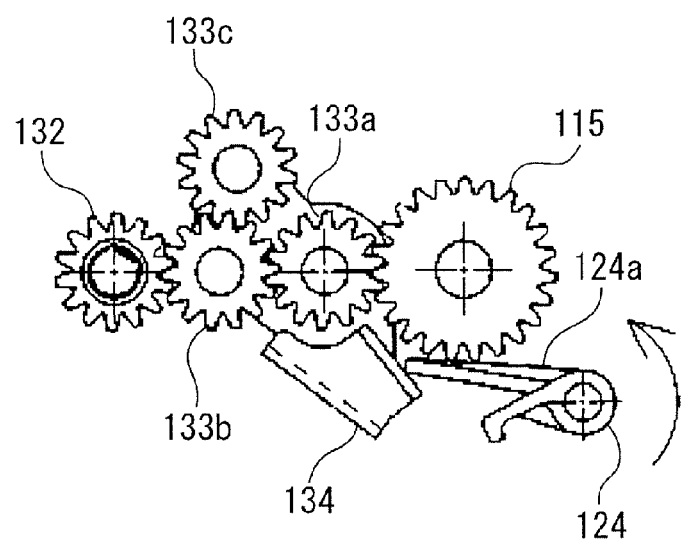

FIG. 21A illustrates how the drive is transmitted to the sheet reversing roller gear 132 when the sheet discharging rotatable member 111 abuts against the sheet discharging roller 110. In this case, the drive from the sheet discharging roller gear 115 is transmitted to the sheet reversing roller gear 132 through the gears 133a to 133c, and hence the sheet reversing roller gear 132 rotates in the same direction as that of the sheet discharging roller gear 115. FIG. 21B illustrates a state in which the separating arm 124 is operated so that the gear holder 134 rotates in an arrow direction of FIG. 21B by a pressing portion 124a provided to the separating arm 124. At this time, the drive from the sheet discharging roller gear 115 is transmitted to the sheet reversing roller gear 132 through the gears 133a and 133b, and hence the sheet reversing roller gear 132 rotates in the reverse direction to that of the sheet discharging roller gear 115.

As described above, when the sheet discharging rotatable member 111 abuts against the sheet discharging roller 110, the sheet reversing roller 113 rotates in the same direction as that of the sheet discharging roller 110, and when the sheet discharging rotatable member 111 is separated from the sheet discharging roller 110, the sheet reversing roller 113 rotates in the reverse direction to that of the sheet discharging roller 110. As described above, even in the case where the rotation of the sheet reversing roller 113 is controlled using the switching unit 133 structured as in this embodiment, the sheet conveying control similar to that of the above-mentioned fifth embodiment can be performed.

Further, in this embodiment, the sheet reversing roller 113 may start to reverse and convey the preceding sheet again in association with the operation of separating the sheet discharging rotatable member 111 by the separating arm 124, and hence the separation detecting sensor is unnecessary. Further, in this embodiment, the drive is transmitted from the sheet discharging roller gear 115 to the sheet reversing roller gear 132, and hence any forward and reverse rotation drive mechanism dedicated to the sheet reversing roller 113 is unnecessary. Further, the switching of the rotation direction of the sheet reversing roller 113 can track the switching of forward and reverse rotation of the sheet discharging roller 110 with no delay, and hence the sheet conveying operation can be performed more stably.

Figure 22A:
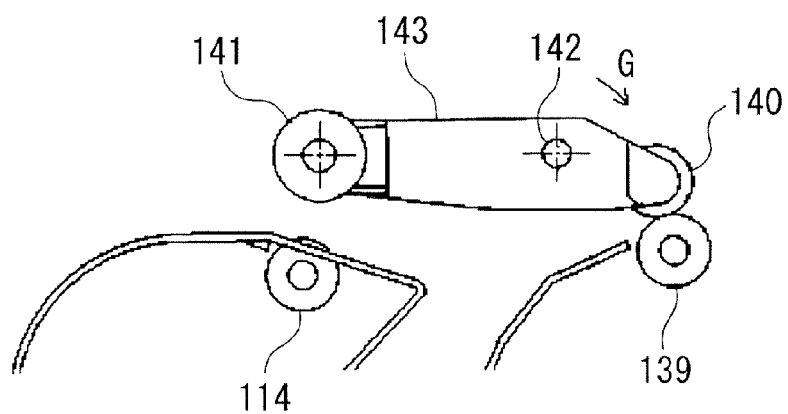
FIGS. 22A and 22B are explanatory views illustrating structures of a sheet discharging roller and a sheet reversing roller of a sheet conveying apparatus according to a seventh embodiment of the present invention.
Figure 22B:
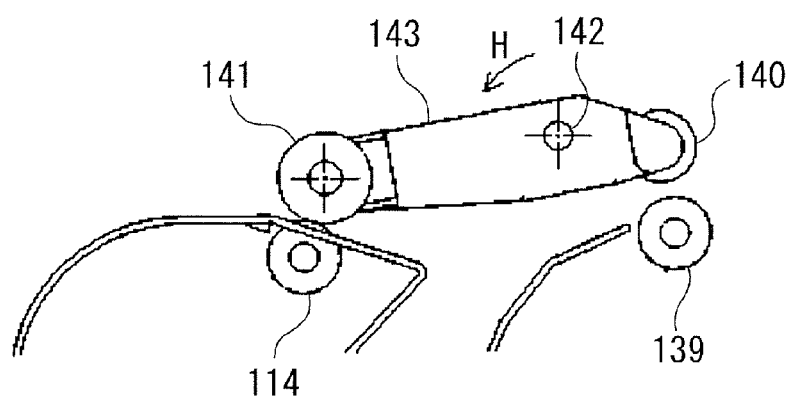

Next, a seventh embodiment of the present invention will be described. FIGS. 22A and 22B are explanatory views illustrating structures of a sheet discharging roller and a sheet reversing roller of a sheet conveying apparatus according to this embodiment. In FIGS. 22A and 22B, the sheet conveying apparatus includes a forward and reverse rotatable sheet discharging roller 139, and a sheet discharging rotatable member 140, which is provided so as to be brought into contact with and separated from the sheet discharging roller 139. Further, the sheet conveying apparatus includes a forward and reverse rotatable sheet reversing roller 141, and a sheet reversing rotatable member 114 to be rotated in association with the rotation of the sheet reversing roller 141. The sheet discharging rotatable member 140 and the sheet reversing roller 141 are held by a sheet reversing holder 143, which is a rocking member freely rockable with a rocking shaft 142 as a fulcrum.

FIG. 22A illustrates a state in which the sheet discharging rotatable member 140 supported at one end portion of the sheet reversing holder 143 abuts against the sheet discharging roller 139. At this time, the sheet reversing holder 143 is inclined in an arrow G direction of FIG. 22A with the rocking shaft 142 as a fulcrum, and the sheet reversing roller 141 is separated from the sheet reversing rotatable member 114. FIG. 22B illustrates a state in which the sheet reversing holder 143 is inclined in an arrow H direction of FIG. 22B with the rocking shaft 142 as a fulcrum. At this time, the sheet reversing roller 141 supported at the other end portion of the sheet reversing holder 143 abuts against the sheet reversing rotatable member 114, and the sheet discharging rotatable member 140 is separated from the sheet discharging roller 139.

Figure 23A:
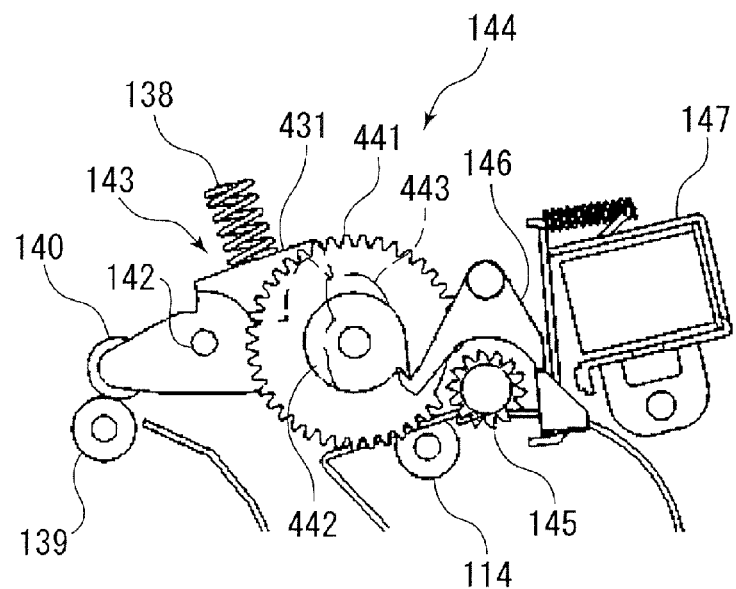
FIGS. 23A and 23B are explanatory views illustrating an operation of a rocking mechanism.
Figure 23B:
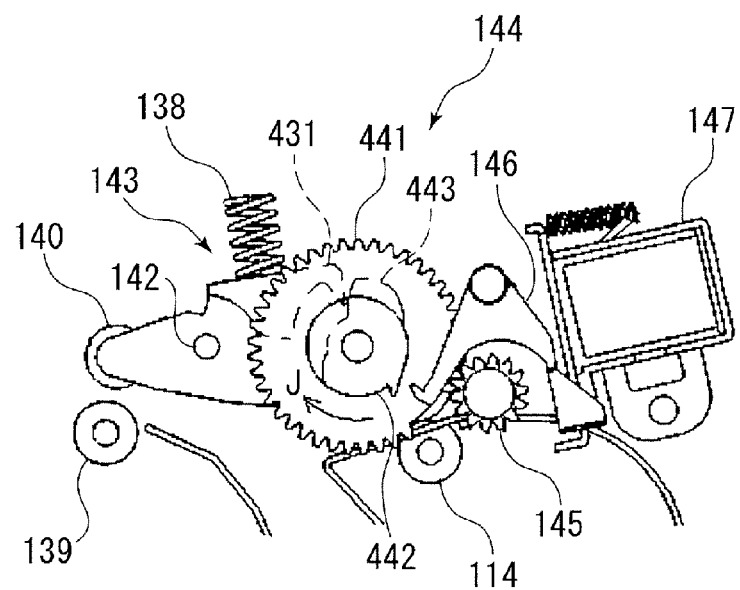

FIGS. 23A and 23B are explanatory views illustrating a rocking mechanism for rocking the sheet reversing holder 143. In FIGS. 23A and 23B, the rocking mechanism includes a raising/lowering cam 144 having a gear portion 441 including a toothless portion on its outer periphery, an input gear 145, which is to mesh with the gear portion 441, a lever 146, which is to engage with the raising/lowering cam 144 at an initial position, and a solenoid 147 which controls the lever 146. The raising/lowering cam 144 includes, on both surfaces of the gear portion 441, an engagement portion 442, which is to engage with the lever 146, and a cam portion 443 held in contact with a protruding portion 431 of the sheet reversing holder 143, for controlling raising and lowering of the sheet reversing holder 143.

FIG. 23A is a view illustrating a state in which the solenoid 147 is turned OFF so that the raising/lowering cam 144 and the lever 146 engage with each other. When the solenoid 147 is turned OFF, the toothless portion of the raising/lowering cam 144 is opposed to the input gear 145, and the raising/lowering cam 144 is stationary while being biased by a spring 138 through the sheet reversing holder 143. This state corresponds to the above-mentioned separated state of the sheet reversing roller 141 of FIG. 22A.

When the solenoid 147 is turned ON in this state so that the lever 146 is separated from the engagement portion 442, the protruding portion 431 of the sheet reversing holder 143 rotates the cam portion 443 with the spring 138. Accordingly, as illustrated in FIG. 23B, the gear portion 441 meshes with the input gear 145, with the result that the raising/lowering cam 144 rotates in an arrow J direction of FIG. 23B at a constant speed. Further, the cam portion 443 lowers the sheet reversing holder 143, and the sheet reversing roller 141 and the sheet reversing rotatable member 114 abuts against each other.

Note that, in this embodiment, the one-revolution period of the raising/lowering cam 144 is set so that the sheet discharging rotatable member 140 is maintained in the separated state during the period after the preceding sheet and the succeeding sheet start to be conveyed to pass each other until the preceding sheet exits the sheet discharging roller pair. Accordingly, the sheet reversing holder 143 is in the state of FIG. 23B until the engagement portion 442 engages with the lever 146 again.

Figure 24:
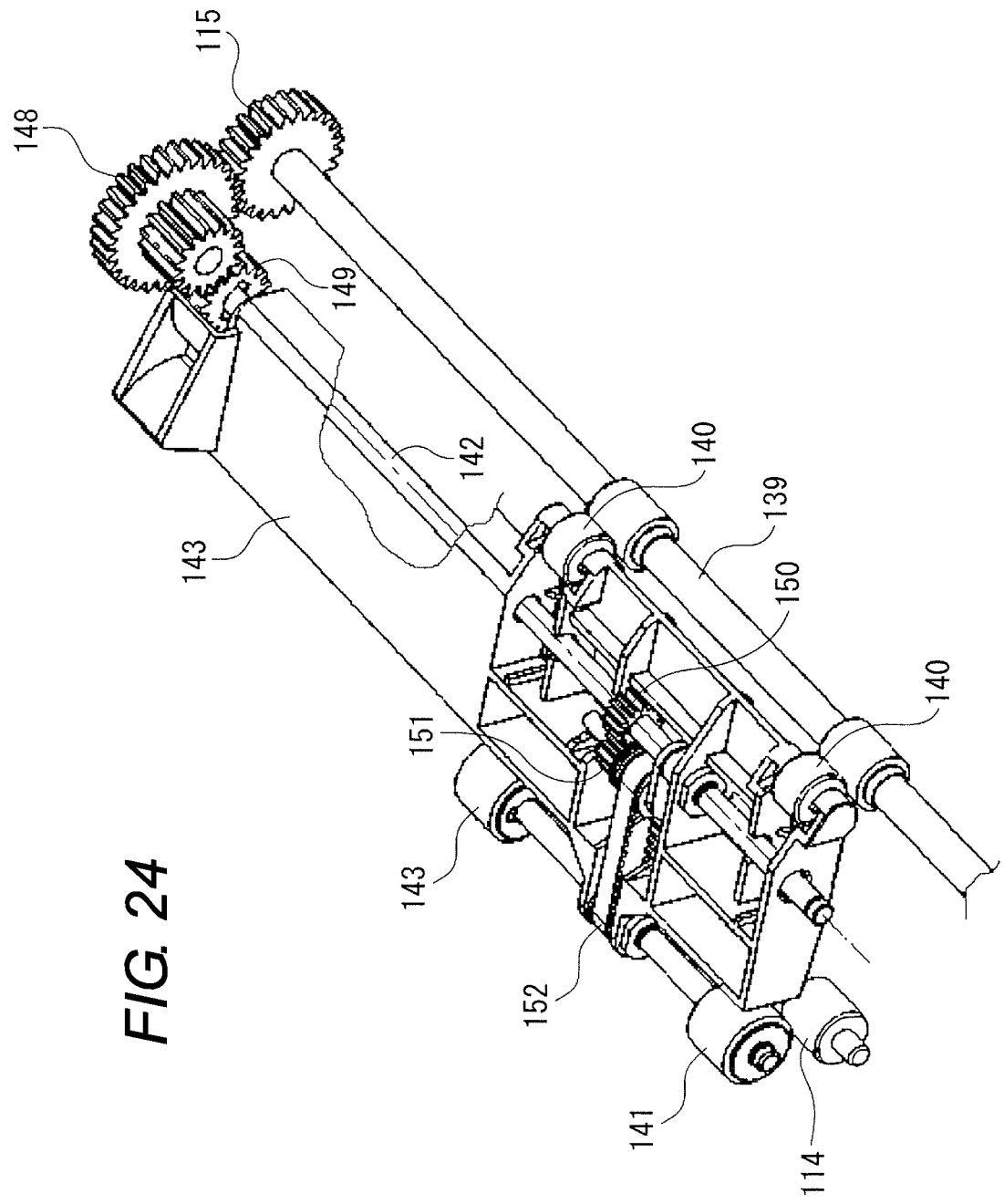
FIG. 24 is an explanatory view illustrating a drive mechanism for the sheet reversing roller.

FIG. 24 is an explanatory view illustrating a drive mechanism for the sheet reversing roller 141. The sheet reversing roller 141 is driven by a timing belt 152 to which the drive is transmitted from the sheet discharging roller gear 115 through a gear 148, gears 149 and 150 on the rocking shaft 142, and a gear 151. Therefore, the sheet discharging roller 139 and the sheet reversing roller 141 constantly rotate in directions reverse to each other.

Next, referring to FIGS. 25A to 25F, an operation of the sheet conveying apparatus structured as described above at the time of successive duplex image formation will be described. When the successive duplex image formation operation is started, as illustrated in FIG. 25A, the first sheet S1 having an image formed on the first side is temporarily conveyed in the direction of the sheet discharge tray 13 through rotation of the sheet discharging roller 139 in the sheet discharging direction. When the trailing edge of the first sheet S1 passes through the sheet discharge sensor 126 and exits the branch point 14 after a predetermined period of time, the sheet discharging roller 139 rotates in the sheet reversing direction, and as illustrated in FIG. 25B, the first sheet S1 is conveyed to the reconveying passage 15.

Subsequently, the second sheet S2 having an image formed on the first side is conveyed successively after the first sheet S1 at a predetermined interval. When the leading edge of the second sheet S2 is detected by the sheet discharge sensor 126, the sheet discharging roller 139 rotates in the sheet discharging direction. Accordingly, as illustrated in FIG. 25C, the first sheet S1 is conveyed again in the direction of the sheet discharge tray 13. Note that, the discharging, reversing, and re-discharging of the first sheet S1 is performed in the stated order only through the forward and reverse rotation of the sheet discharging roller 139.

As illustrated in FIG. 25D, when the second sheet S2 is nipped between the sheet discharging roller 139 and the sheet discharging rotatable member 140 while being overlaid on the first sheet S1, as illustrated in FIG. 25E, the sheet reversing holder 143 rocks. Accordingly, the sheet discharging rotatable member 140 is separated from the sheet discharging roller 139, and the sheet reversing roller 141 abuts against the sheet reversing rotatable member 114. After the first sheet S1 and the second sheet S2 are conveyed to pass each other in this state, when the first sheet S1 exits the sheet discharging roller pair, as illustrated in FIG. 25F, the sheet reversing holder 143 returns to the initial position. Accordingly, the sheet reversing roller 141 is separated from the sheet reversing rotatable member 114, and the sheet discharging rotatable member 140 abuts against the sheet discharging roller 139.

As described above, in this embodiment, the sheet discharging rotatable member 140 and the sheet reversing roller 141 abut and are separated by controlling the rocking of the sheet reversing holder 143. With the above-mentioned structure, the state shifts in an order of the following items i) to iii) through the rocking operation of the sheet reversing holder 143. Therefore, before the preceding sheet starts to be reversed and conveyed again, the sheet discharging rotatable member 140 is separated reliably, with the result that the above-mentioned image defect can be prevented from occurring.

i) The sheet discharging roller pair abuts and the sheet reversing roller pair is separated (initial state).
ii) The sheet discharging roller pair and the sheet reversing roller pair are both separated.
iii) The sheet discharging roller pair is separated and the sheet reversing roller pair abuts.

Further, in this embodiment, the conveyance by the sheet reversing roller 141 is performed only when the preceding sheet is reversed and conveyed again. Thus, the conveying speed of the sheet reversing roller 141 may be set higher than that of the sheet discharging roller 139, to thereby further enhance the productivity of the duplex printing.

Note that, the above description is directed to the case where the sheet conveying apparatus according to the present invention is used for the laser beam printer as an example of the image forming apparatus. However, the present invention is not limited thereto, and the sheet conveying apparatus according to the present invention is also applicable to an image reading apparatus including an image reading portion for reading an image formed on a sheet that is conveyed by the sheet conveying apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-230412, filed Oct. 13, 2010, which is hereby incorporated by reference in its entirety.

REFERENCE SIGNS LIST 1 laser beam printer
1A laser beam printer main body
1B image forming portion
1E sheet conveying apparatus
1F sheet conveying portion
6 conveying path
10 fixing portion
11 sheet discharge conveying path
12 sheet discharging roller pair
12a lower roller
12b upper roller
14 branch point
15 reconveying passage
16 reconveying roller
18 drive motor
19, 20 first and second planetary gearing mechanisms
26 third planetary gearing mechanism
30 sheet presser
30b pressing plate
50 control portion
51 sheet reverse sensor
110 sheet discharging roller
111 sheet discharging rotatable member
113 sheet reversing roller
114 sheet reversing rotatable member
110A separating mechanism
115 sheet discharging roller gear
125 separation detecting sensor
133 switching unit
139 sheet discharging roller
140 sheet discharging rotatable member
141 sheet reversing roller
114 sheet reversing rotatable member
143 sheet reversing holder
S sheet

The invention claimed is:

1. A sheet conveying apparatus, comprising:
a sheet conveying path;
a reconveying path, which is branched from the sheet conveying path;
a sheet conveying portion which conveys a sheet, which is conveyed through the sheet conveying path, selectively between a forward direction and a reverse direction toward the reconveying path; and
a control portion which controls the sheet conveying portion to convey a preceding sheet in the reverse direction toward the reconveying path, and then convey the preceding sheet in the forward direction together with a succeeding sheet, and thereafter convey the preceding sheet in the reverse direction toward the reconveying path while conveying the succeeding sheet in the forward direction.

2. A sheet conveying apparatus according to claim 1, wherein the control portion controls the sheet conveying portion to convey, after the sheet conveying portion conveys the preceding sheet in the reverse direction toward the reconveying path, the preceding sheet and the succeeding sheet in the forward direction in an overlaid manner by causing a leading edge of the succeeding sheet to enter the sheet conveying portion in a state in which the preceding sheet is stopped temporarily or conveyed in the forward direction.

3. A sheet conveying apparatus according to claim 1, wherein the sheet conveying portion comprises a conveying roller pair including a first conveying roller, which is forward and reverse rotatable, and a second conveying roller, which performs reverse rotation to convey the sheet toward the reconveying path, and
wherein the control portion controls an operation of the conveying roller pair so that, after the preceding sheet is conveyed in the reverse direction toward the reconveying path, the first conveying roller temporarily conveys the preceding sheet in the forward direction together with the succeeding sheet, and while the preceding sheet and the succeeding sheet are being conveyed in the forward direction, the second conveying roller performs the reverse rotation to convey the preceding sheet toward the reconveying path with the preceding sheet and the succeeding sheet passing each other.

4. A sheet conveying apparatus according to claim 3, wherein a sheet conveying speed of the second conveying roller is set higher than a sheet conveying speed of the first conveying roller.

5. A sheet conveying apparatus according to claim 1, further comprising a sheet pressing member, which is arranged downstream of the sheet conveying portion in a sheet conveying direction of the sheet conveyed in the forward direction, the sheet pressing member pressing the sheet conveyed by the sheet conveying portion, wherein in a state in which the sheet conveying portion nips two sheets and in a state in which the preceding sheet is conveyed in the reverse direction while the succeeding sheet is conveyed in the forward direction, the sheet pressing member is situated at a retreat position at which the sheet pressing member is retreated from the conveyed sheet.

6. A sheet conveying apparatus according to claim 1, further comprising:
   a sheet discharging roller, which is provided in the sheet conveying portion so as to be forward and reverse rotatable;
   a sheet discharging rotatable member, which is provided in the sheet conveying portion so as to be brought into contact with and separated from the sheet discharging roller; and
   a conveying roller, which is provided in the reconveying path so as to convey the sheet,
   wherein, after the sheet conveying portion conveys two sheets in the forward direction in an overlaid manner, the sheet discharging rotatable member is separated, and the preceding sheet is conveyed in the reverse direction by the conveying roller.

7. A sheet conveying apparatus according to claim 6, further comprising:
   a drive source which drives the conveying roller; and
   a switching portion which switches a rotation direction of the conveying roller that is driven by the drive source,
   wherein, when the sheet discharging rotatable member is separated from the sheet discharging roller, the switching portion switches the rotation direction of the conveying roller to a direction which enables the preceding sheet to be conveyed in the reverse direction.

8. A sheet conveying apparatus according to claim 7, wherein the sheet discharging roller is driven by the drive source.

9. A sheet conveying apparatus according to claim 8, further comprising:
   a conveying rotatable member, against which the conveying roller separably abuts; and
   a rocking member, which supports the sheet discharging rotatable member at one end portion thereof, and supports the conveying roller at another end portion thereof,
   wherein, when the sheet discharging rotatable member is separated, the conveying roller abuts against the conveying rotatable member, and when the conveying roller is separated, the sheet discharging rotatable member abuts against the sheet discharging roller.

10. An image forming apparatus, comprising:
    an image forming portion which forms an image on a sheet; and
    a sheet conveying apparatus as recited in claim 1, which feeds the sheet to the image forming portion.

11. An image forming apparatus according to claim 10, wherein the control portion controls the sheet conveying portion to convey, after the sheet conveying portion conveys the preceding sheet in the reverse direction toward the reconveying path, the preceding sheet and the succeeding sheet in the forward direction in an overlaid manner by causing a leading edge of the succeeding sheet to enter the sheet conveying portion in a state in which the preceding sheet is stopped temporarily or conveyed in the forward direction.

12. An image forming apparatus according to claim 10, wherein the sheet conveying portion comprises a conveying roller pair including a first conveying roller, which is forward and reverse rotatable, and a second conveying roller, which performs reverse rotation to convey the sheet toward the reconveying path, and
    wherein the control portion controls an operation of the conveying roller pair so that, after the preceding sheet is conveyed in the reverse direction toward the reconveying path, the first conveying roller temporarily conveys the preceding sheet in the forward direction together with the succeeding sheet, and while the preceding sheet and the succeeding sheet are being conveyed in the forward direction, the second conveying roller performs the reverse rotation to convey the preceding sheet toward the reconveying path with the preceding sheet and the succeeding sheet passing each other.

13. An image forming apparatus according to claim 12, wherein a sheet conveying speed of the second conveying roller is set higher than a sheet conveying speed of the first conveying roller.

14. A sheet conveying apparatus according to claim 10, further comprising a sheet pressing member, which is arranged downstream of the sheet conveying portion in a sheet conveying direction of the sheet conveyed in the forward direction, the sheet pressing member pressing the sheet conveyed by the sheet conveying portion, wherein in a state in which the sheet conveying portion nips two sheets and in a state in which the preceding sheet is conveyed in the reverse direction while the succeeding sheet is conveyed in the forward direction, the sheet pressing member is situated at a retreat position at which the sheet pressing member is retreated from the conveyed sheet.

15. An image forming apparatus according to claim 10, further comprising:
    a sheet discharging roller, which is provided in the sheet conveying portion so as to be forward and reverse rotatable;
    a sheet discharging rotatable member, which is provided in the sheet conveying portion so as to be brought into contact with and separated from the sheet discharging roller; and
    a conveying roller, which is provided in the reconveying path so as to convey the sheet,
    wherein, after the sheet conveying portion conveys two sheets in the forward direction in an overlaid manner, the sheet discharging rotatable member is separated, and the preceding sheet is conveyed in the reverse direction by the conveying roller.

16. An image forming apparatus according to claim 15, further comprising:
    a drive source which drives the conveying roller; and
    a switching portion which switches a rotation direction of the conveying roller that is driven by the drive source,
    wherein, when the sheet discharging rotatable member is separated from the sheet discharging roller, the switching portion switches the rotation direction of the conveying roller to a direction which enables the preceding sheet to be conveyed in the reverse direction.

17. An image forming apparatus according to claim 16, wherein the sheet discharging roller is driven by the drive source.

18. An image forming apparatus according to claim 17, further comprising:
    a conveying rotatable member, against which the conveying roller separably abuts; and
    a rocking member, which supports the sheet discharging rotatable member at one end portion thereof, and supports the conveying roller at another end portion thereof,
    wherein, when the sheet discharging rotatable member is separated, the conveying roller abuts against the conveying rotatable member, and when the conveying roller is separated, the sheet discharging rotatable member abuts against the sheet discharging roller.

* * * * *